United States Patent
Kuo et al.

(10) Patent No.: US 9,513,423 B2
(45) Date of Patent: Dec. 6, 2016

(54) METHODS AND APPARATUS FOR POWER-EQUALIZED OPTICAL FREQUENCY COMB GENERATION

(71) Applicant: RAM PHOTONICS, LLC, San Diego, CA (US)

(72) Inventors: Ping Piu Kuo, San Diego, CA (US); Yauheni Mysilvets, San Diego, CA (US)

(73) Assignees: John R. Marciante, Webster, NY (US); Stojan Radic, San Diego, CA (US); Nikola Alic, La Jolla, CA (US)

( * ) Notice: Subject to any disclaimer, the term of this patent is extended or adjusted under 35 U.S.C. 154(b) by 0 days.

(21) Appl. No.: 13/886,821

(22) Filed: May 3, 2013

(65) Prior Publication Data

US 2014/0178020 A1    Jun. 26, 2014

Related U.S. Application Data

(63) Continuation of application No. 13/725,869, filed on Dec. 21, 2012, now Pat. No. 8,447,155.
(Continued)

(51) Int. Cl.
*G02B 6/00* (2006.01)
*G02F 1/35* (2006.01)
(Continued)

(52) U.S. Cl.
CPC .......... *G02B 6/00* (2013.01); *G02F 1/353* (2013.01); *G02F 1/383* (2013.01); *G02F 1/39* (2013.01);
(Continued)

(58) Field of Classification Search
CPC ........ G02F 1/3536; G02F 1/383; G02F 1/353; G02F 2203/54; G02F 2203/56
See application file for complete search history.

(56) References Cited

U.S. PATENT DOCUMENTS 6,436,857 B1 *  8/2002  Brueck et al. ................. 501/37
6,590,910 B2     7/2003  Lin
(Continued)

OTHER PUBLICATIONS

Notice of Allowance for U.S. Appl. No. 13/725,869, mailed Mar. 7, 2013, 9 pages.
(Continued)

*Primary Examiner* — Omar R Rojas
(74) *Attorney, Agent, or Firm* — Kilpatrick Townsend & Stockton, LLP

(57) ABSTRACT

An optical device for generating a frequency comb includes an optical source and a first waveguide comprising a nonlinear optical medium operable to mix at least two input optical waves to generate a plurality of first optical waves. The optical device also includes a second waveguide concatenated to the first waveguide and characterized by a first dispersion characteristics and operable to compress the waveforms of the plurality of first optical waves and to reduce a frequency chirp introduced by the first waveguide. The optical device additionally includes a third waveguide concatenated to the second waveguide. The third waveguide comprises a nonlinear optical medium and is operable to mix the plurality of first optical waves to generate a plurality of second optical waves and to increase a total number of second optical waves with respect to a total number of first optical waves.

20 Claims, 16 Drawing Sheets

Related U.S. Application Data

(60) Provisional application No. 61/700,807, filed on Sep. 13, 2012.

(51) Int. Cl.
  *G02F 1/383* (2006.01)
  *G02F 1/39* (2006.01)
  *G02B 6/02* (2006.01)

(52) U.S. Cl.
  CPC ....... *G02B 6/02247* (2013.01); *G02F 2201/16* (2013.01); *G02F 2203/26* (2013.01); *G02F 2203/56* (2013.01)

(56) References Cited

U.S. PATENT DOCUMENTS

| | | | |
|---|---|---|---|
| 6,920,263 | B2 | 7/2005 | Tadakuma et al. |
| 7,099,541 | B2 | 8/2006 | Terahara et al. |
| 7,155,095 | B2* | 12/2006 | Aso et al. ............... 385/123 |
| 7,483,608 | B2 | 1/2009 | Inoue et al. |
| 8,023,537 | B2* | 9/2011 | Inoue ............... 372/25 |
| 8,275,263 | B1* | 9/2012 | Franklin ............... 398/92 |
| 8,447,155 | B1* | 5/2013 | Kuo et al. ............... 385/122 |
| 8,611,759 | B1* | 12/2013 | Kvavle et al. ............... 398/182 |
| 2002/0071454 | A1 | 6/2002 | Lin |
| 2002/0164135 | A1 | 11/2002 | Tadakuma et al. |
| 2007/0280613 | A1 | 12/2007 | Inoue et al. |
| 2008/0232406 | A1* | 9/2008 | Nicholson ............... G02F 1/365 372/4 |
| 2010/0209060 | A1* | 8/2010 | Inoue ............... H04B 10/25253 385/122 |

OTHER PUBLICATIONS

Kuo, Bill P. et al., Wavelength Multicasting via Frequency Comb Generation in a Bandwidth-enhanced Fiber Optical Parametric Mixer, Journal of Lightwave Technology, vol. 29, No. 23, dated Dec. 1, 2011, pp. 3515-3522.

European Search Report, EP, Oct. 15, 2015, European Patent Office.

Myslivets, Evgeny et al., "Generation of wideband frequency combs by continuous-wave seeding of multistage mixers with synthesized dispersion," Jan. 30, 2012, vol. 20, No. 3, Optics Express 3331, pp. 1-14.

Tadakuma, Masateru et al., "A 104GHz 328fs soliton pulse train generation through a comb-like dispersion profiled fiber using short high nonlinearity dispersion fibers," Optic Fiber Communication Conference, Mar. 7, 2000, Baltimore, MD, US, pp. 178-180.

Inoue, Takashi et al., "Optical Pulse Compression Based on Stationary Rescaled Pulse Propagation in a Comblike Profiled Fiber," Journal of Lightwave Technology, vol. 24, No. 7, Jul. 2006, pp. 2510-2522.

\* cited by examiner

METHODS AND APPARATUS FOR POWER-EQUALIZED OPTICAL FREQUENCY COMB GENERATION

CROSS-REFERENCES TO RELATED APPLICATIONS

This application is a continuation of U.S. patent application Ser. No. 13/725,869, filed on Dec. 21, 2012, now U.S. Pat. No. 8,447,155, entitled "Methods and Apparatus for Power-Equalized Optical Frequency Comb Generation," which claims priority to U.S. Provisional Patent Application No. 61/700,807, filed on Sep. 13, 2012, entitled "Methods and Apparatus for Power-Equalized Optical Frequency Comb Generation," the disclosures of which are hereby incorporated by reference in their entirety for all purposes.

BACKGROUND OF THE INVENTION

An optical or radio-frequency (RF) source is commonly referred to as a frequency comb when its spectral representation is given by multiple, equidistantly spaced frequency tones. Various mechanisms can be used to generate a frequency comb; these are often classified with respect to their spectral bandwidth, frequency stability, spectral tone purity (i.e., signal-to-noise ratio or SNR), coherence and power. Frequency combs can be used to establish a spectral reference that can be used to relate the position of a spectral absorption or emission profile in applications such as in precision ranging, spectroscopy, sensing, or the like. The spectral reference can be established either locally, when the bandwidth of the frequency comb is smaller than a frequency octave, or globally, when the bandwidth of the frequency comb is equal to or exceeds a spectral octave. Both type of frequency combs can be used in metrology, spectroscopy, clock distribution, physical ranging, and waveform synthesis, among other applications. To be practically useful, a device or means for frequency comb generation should be power efficient, possess sufficient spectral bandwidth, be characterized by power equalized spectrum across the operational bandwidth and have high degree of coherency. As a secondary requirement, frequency comb device should also be compact and capable of stable operation in unprotected environments outside of laboratory conditions.

Commonly used techniques for frequency comb generation include, in direct or indirect form, the use of optical or RF cavities to establish the frequency reference. Frequency comb generation using mode-locked lasers (MLLs) is particularly widespread, and can be used in conjunction with nonlinear process outside of an MLL cavity. An MLL source inherently represents frequency comb by itself: pulsed temporal output, when observed in the spectral domain, corresponds to a frequency comb whose spectral width is defined by a gain bandwidth of the laser medium, with the rest of parameters dictated by the specifics of the physical locking mechanism. In the temporal domain, separation between adjacent optical pulses of an MLL output is referred to as its repetition rate; in the spectral domain, an inverse of the repetition rate defines the frequency pitch (separation between adjacent spectral peaks) of the frequency comb. An MLL is often used to seed the nonlinear process in order to enhance bandwidth or other performance parameters of the frequency comb. When coupled with various feedback mechanisms, this approach has led to the demonstration of devices used in wave-forming, ranging and spectroscopy.

The use of an MLL source for frequency comb generation necessarily introduces performance limitations. The most severe limit is imposed by the stability requirement placed on the MLL cavity. In the case when the MLL cavity is not sufficiently stabilized, its output is characterized by temporal and frequency uncertainty. In the case when a nonlinear process is used to expand the bandwidth or enhance the MLL response, these fluctuations are further amplified, thus degrading the accuracy and overall performance of the frequency comb source. While many techniques for MLL stabilization were reported and developed in the past, the fundamental limit is established by physical coupling between the frequency pitch (inverse of the repetition rate) and the cavity physical size. Higher repetition rate (higher frequency pitch) generally requires a shorter physical cavity in either the optical or RF domain. Consequently, the tolerance required to control such cavity length decreases until it reaches a physical scale that cannot be physically realized.

Thus there is a need in the art for source with repeatable output pulse characteristics independent of the pulse repetition frequency.

SUMMARY OF THE INVENTION

Embodiments described herein relate to methods and systems for the generation of multiple frequency tones, and more specifically to specialized devices using dispersion and managed parametric interaction in nonlinear optical waveguides to create frequency combs.

According to an embodiment of the present invention, an optical device for generating a frequency comb is provided. The optical device includes an optical source including at least two input optical waves characterized by a first input frequency and a second input frequency, respectively. The first input frequency and the second input frequency are separated by a frequency spacing. The optical device also includes a first waveguide comprising a nonlinear optical medium characterized by a nonlinear optical response and operable to mix the at least two input optical waves to generate a plurality of first optical waves characterized by respective first frequencies separated from each other by the frequency spacing and characterized by a frequency chirp and a second waveguide concatenated to the first waveguide. The second waveguide is characterized by a first dispersion characteristics such that the second waveguide is operable to compress the waveforms of the plurality of first optical waves and to reduce the frequency chirp introduced by the first waveguide. The optical device further includes a third waveguide concatenated to the second waveguide, wherein the third waveguide comprises a nonlinear optical medium and is operable to mix the plurality of first optical waves to generate a plurality of second optical waves characterized by respective second frequencies separated from each other by the frequency spacing. The third waveguide is characterized by a second dispersion characteristics such that the third waveguide is operable to increase a total number of second optical waves with respect to a total number of first optical waves.

According to another embodiment of the present invention, a method of generating a frequency comb is provided. The method includes providing at least two input optical waves characterized by respective input frequencies separated from each other by a frequency spacing and mixing, via a first waveguide, the at least two input optical waves to provide a plurality of first optical waves characterized by respective first frequencies separated from each other by the frequency spacing. The first waveguide comprises a nonlinear optical medium having a nonlinear response that introduces a frequency chirp in the plurality of first optical waves. The method also includes compressing, via a second waveguide concatenated to the first waveguide, the plurality of first optical waves to provide a plurality of first compressed optical waves. The second waveguide is characterized by a first dispersion characteristics such that the second waveguide reduces the frequency chirp introduced by the first waveguide. The method further includes mixing, via a third waveguide concatenated to the second waveguide, the plurality of first compressed optical waves to provide a plurality of second optical waves characterized by respective second frequencies separated from each other by the frequency spacing. The third waveguide is characterized by a second dispersion characteristics that increases a total number of second optical waves in comparison to a total number of first optical waves.

According to an embodiment of the present invention, a frequency comb generator comprises (a) an input operable to input at least two optical inputs centered at different frequencies, and (b) at least three distinct and concatenated waveguides (i.e., optical waveguides). In some embodiments, the optical waveguides include one or more fiber-based amplifiers. A first waveguide possesses optical nonlinearity to induce frequency chirp matched to the input waves. A second waveguide is concatenated to the first waveguide and possesses the dispersion parameter necessary to reduce or cancel the frequency chirp induced within the first waveguide. A third waveguide is concatenated to the second waveguide and possesses nonlinearity and dispersion parameter that is matched to the output of the second waveguide, wherein the parameter matching is operable to generate a greater number of frequency tones after the third waveguide than were present after the first waveguide. In some embodiments, the count of frequency tones is maximized.

In one embodiment, the first optical waveguide is characterized by a nonlinear parameter that is greater than about 2 $(W \cdot km)^{-1}$.

In one embodiment, the second waveguide is characterized by a positive chromatic dispersion parameter $D=-\lambda/c \cdot d^2n/d\lambda^2$ that reduces or cancels self-phase modulation induced by the preceding waveguide section.

In one embodiment, the third waveguide is characterized by a chromatic dispersion with slope approximately lower than 0.05 ps/km-nm$^2$ and within the spectral bandwidth of the frequency comb.

In another embodiment, the third waveguide is characterized by a dispersion with maximal chromatic dispersion parameter (i.e., a peak of the chromatic dispersion curve) that is less than or equal to zero. In an embodiment, the wavelength range over which the chromatic dispersion is measured is equal to the wavelength range (i.e., the spectral bandwidth) of the frequency comb. In one embodiment, the third waveguide is characterized by a chromatic dispersion parameter that is lower than +1 ps/km-nm.

In another embodiment, a frequency comb generator comprises: (a) an input operable to input at least two optical inputs centered at different frequencies, and (b) at least three distinct and concatenated optical waveguides. The first optical waveguide possesses optical nonlinearity to induce frequency chirp matched to the input waves. The second optical waveguide is concatenated to the first waveguide and possesses the chromatic dispersion characteristics necessary to reduce or cancel the frequency chirp induced within the first waveguide. The third optical waveguide is concatenated to the second waveguide and possesses nonlinearity and dispersion that is matched to the output of the second waveguide. The parameter matching is operable to generate an increased number (e.g., in some embodiments a maximal count) of frequency tones in comparison to the number of frequency tones present after previous stages. The frequency comb generator can further comprise a fourth optical waveguide concatenated to the third waveguide and possessing the chromatic dispersion characteristics to reduce or cancel the frequency chirp induced by the third waveguide and a fifth waveguide concatenated to the fourth waveguide and possessing nonlinearity and dispersion that is matched to the output of the fourth waveguide. The parameter matching is operable to generate an increased number of frequency tones.

In one embodiment, the waveguide pattern established by the combination of compressor-mixer waveguides exemplified by second-and-third and fourth-and-fifth waveguides is repeated. Such repetition is configured to reach the desired comb bandwidth, power efficiency, or noise performance.

In one embodiment, the waveguide dispersion parameter of the third optical waveguide, which can be referred to as a mixer waveguide, is achieved by post-fabrication means to achieve sufficient matching with the output of the second compressor waveguide.

In another embodiment, the waveguide dispersion parameter of third, fifth and all subsequent waveguides serving as a mixer stages, is achieved by post-fabrication means to achieve sufficient matching with the output of all preceding compressor waveguides.

In a specific embodiment, the dispersion parameter of the mixer stage is achieved by longitudinal tensioning of the waveguide.

In another specific embodiment, the dispersion parameter of the mixer stage is achieved by irradiating the waveguide with ultra-violet radiation.

In a further embodiment, the dispersion parameter of the mixer stage is achieved by irradiating the waveguide by radiation to change the refractive index of the waveguide.

In another further embodiment, the dispersion parameter of the mixer stage is achieved by a chemical process to modify the refractive index of the waveguide.

In one embodiment, the first, third, and fifth waveguides comprise optical fibers possessing unit length dispersion that is not greater than +2 ps/km-nm within the operational band of the frequency comb.

In another embodiment, all odd stages comprise optical fibers possessing unit length dispersion that does not exceed 2 ps/km-nm within the operational band of the frequency comb.

In another embodiment, the first, third, and fifth waveguides comprise nonlinear waveguides fabricated using optical media with third-order nonlinear susceptibility greater than $3 \times 10^{-23}$ m$^2$/V$^2$.

According to an embodiment of the invention, a frequency comb generator is provided that comprises at least three concatenated optical waveguides. The first waveguide comprises a nonlinear optical medium and is operable to mix at least two input optical waves at two different frequencies to generate a plurality of first optical waves at respective first frequencies. The first waveguide is characterized by a nonlinear optical response that introduces a frequency chirp in the plurality of first optical waves. The second waveguide is characterized by a dispersion characteristics and is operable to reduce or cancel the frequency chirp in the plurality of first optical waves. The third waveguide comprises a nonlinear optical medium and is operable to mix the plurality of first optical waves to generate a plurality of second optical waves at respective second frequencies. The third waveguide is characterized by dispersion characteristics such that the total number of second optical waves is maximized.

Numerous benefits are achieved by way of the present invention over conventional techniques. For example, embodiments of the present invention provide new methods and systems for generating optical frequency combs with tunable frequency separation not achievable using conventional methods. Additionally, embodiments of the present invention reduce the noise level of an optical frequency comb as compared to that generated by conventional means. Embodiments of the present invention also enhance the optical coherence and frequency stability of optical frequency combs. Furthermore, embodiments of the present invention increase the power efficiency achievable by optical frequency comb generation apparatus. As described herein, various embodiments provide practical advantages in multitude applications. For example, the invention reduces the power consumption of optical transmission systems. In another example, the invention improves the sensitivity and accuracy of spectroscopy apparatus utilizing optical frequency combs. These and other embodiments of the invention along with many of its advantages and features are described in more detail in conjunction with the text below and attached figures.

DETAILED DESCRIPTION OF SPECIFIC EMBODIMENTS

Embodiments of the invention provide apparatuses and methods for generation of wideband, spectrally equalized frequency combs that are seeded by CW tones. These embodiments of the invention afford improved performance characteristics of the generated frequency combs, which have a wide range of applications.

In an alternative to the conventional approach, a frequency comb synthesis can be accomplished without an MLL. Indeed, if a continuous-wave (CW) source can be used to seed frequency comb generation, the inherent limits associated with an MLL or any other pulsed source can be circumvented. A CW source produces an electromagnetic wave having a constant amplitude and a constant frequency. Two CW sources (tones) are used in some embodiments to seed an optical mixer and to generate new frequency tones. In an efficient mixing process, a large number of spectrally equidistant tones can be generated, thus creating a wideband frequency comb. Such generation, while circumventing instabilities inherent to MLL cavities utilizes a mixing process to generate a large number of new frequency tones.

A frequency comb can be generated over a wide spectral bandwidth and with sufficiently high spectral purity if two or more CW tones are used to seed an optical parametric mixer. Such generation utilizes precise control of the parametric mixing process in order to achieve mixing efficiency over a wide spectral bandwidth, while suppressing the noise generation and amplification process. The design and construction of a parametric mixer uses multiple optical stages that play distinct roles in frequency comb generation.

Figure 1:
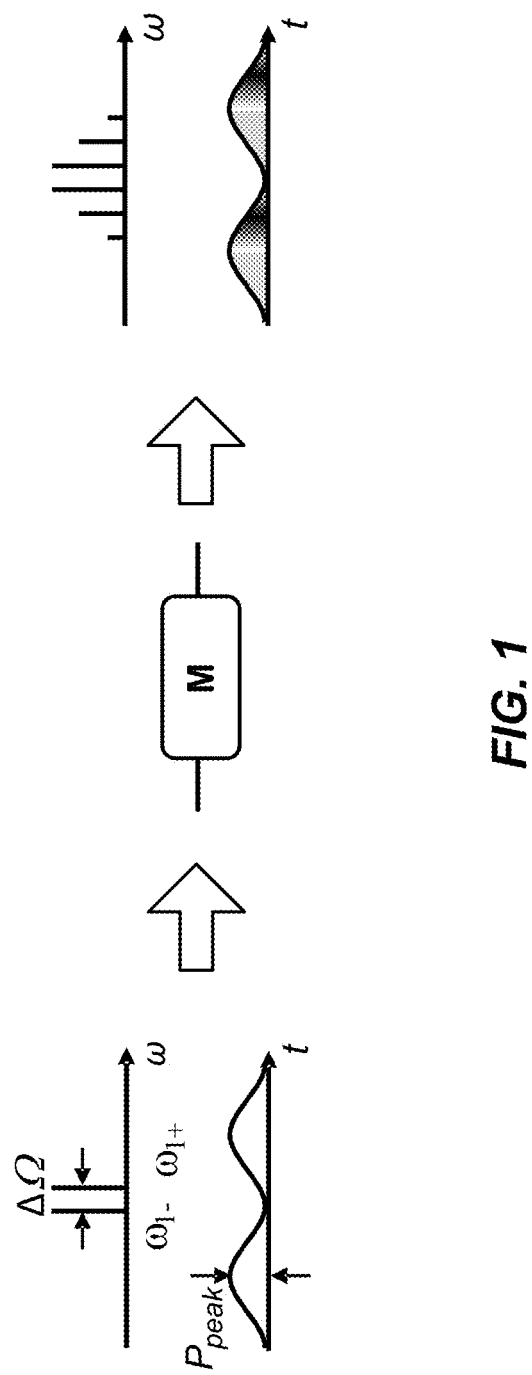
FIG. 1 is a simplified schematic diagram of a system where two input waves at two different frequencies are mixed by a single-stage parametric mixer to generate a frequency comb.

Our invention overcomes the fact that a wideband frequency comb possessing high spectral purity cannot be generated using CW seeding of a homogeneous (single stage) parametric mixer. To illustrate this fact, we refer to FIG. 1, where two co-polarized incident waves, centered at $\omega_{1-}$ and $\omega_{1+}$ (separated by $\Delta\Omega=\omega_{1+}-\omega_{1-}$), denoted as pumps hereinafter, approximately equal in power, are launched into a homogeneous nonlinear waveguide that serves as a single-stage parametric mixer. The scalar input description of the input field is, within the time duration much shorter than the coherence time of the seed lasers, given by:

$$A_i = \sqrt{\frac{P}{2}}\left[e^{-i(\omega_c - \Delta\omega/2)t} + e^{-i(\omega_c + \Delta\omega/2)t}\right] \quad (1)$$

where $\omega_c$ and $\Delta\omega$ are the mean angular frequency and the angular frequency spacing of the pumps, while P denotes their total power. The total power of the pump field follows a sinusoidal form $|A_i|^2 = P\cos(\Delta\omega t) + P$. The static term (second term in the last summation) does not participate in the new tone generation process and can be omitted for the purpose of the current description. If we assume that the mixing is ideally phase-matched (or, equivalently, that the mixer waveguide is dispersionless) and the incident power level is below the threshold of any stimulated scattering process, the evolution of the pumps will be equivalent to a nonlinear phase rotation of the optical carrier. Equivalently, the intensity modulation inherited from the coherent beating of the two seed waves imprints a sinusoidal phase signature onto the waves through a self-phase modulation (SPM) process, as shown in FIG. 1. The resultant output field is:

$$A_o = A_i \exp(i\gamma L_{eff} |A_i|^2) \quad (2)$$
$$= A_i \exp[i\gamma L_{eff} P \cos(\Delta \omega t)] = A_i \exp[i m \cos(\Delta \omega t)]$$

where $\gamma$ is the nonlinear coefficient of the medium, and the phase rotation parameter m is introduced to denote the phase modulation depth due to SPM, which is equal to $\gamma P L_{eff}$. $L_{eff}$ represents the effective interaction length in the presence of loss $\alpha$. The effective length is related to the physical length span L of the mixing medium through this equation:

$$L_{eff} = \frac{1 - e^{-\alpha L}}{\alpha} \quad (3)$$

Eq. (2) reveals an important mechanism for higher-order parametric mixing that plays a role in generation of new frequency tones that form the frequency comb. Equivalently, newly generated optical tones are a frequency-domain manifestation of the nonlinear phase modulation in temporal domain. In strict mathematical terms, frequency domain representation of the output field $A_o$ can be expressed as a summation of constituent harmonics in terms of Bessel function of the first kind $J_n(x)$:

$$A_o = e^{-i\omega_c t} \left\{ \sum_{p=0}^{\infty} B_p e^{i(p+1/2)\Delta\omega t} + \sum_{q=0}^{\infty} C_q e^{-i(-q-1/2)\Delta\omega t} \right\} \quad (4a)$$

$$B_p = i^p [J_p(m) + i J_{p+1}(m)] \quad (4b)$$
$$C_q = i^{-q} [J_{-q}(m) - i J_{-q-1}(m)]$$

Figure 2:
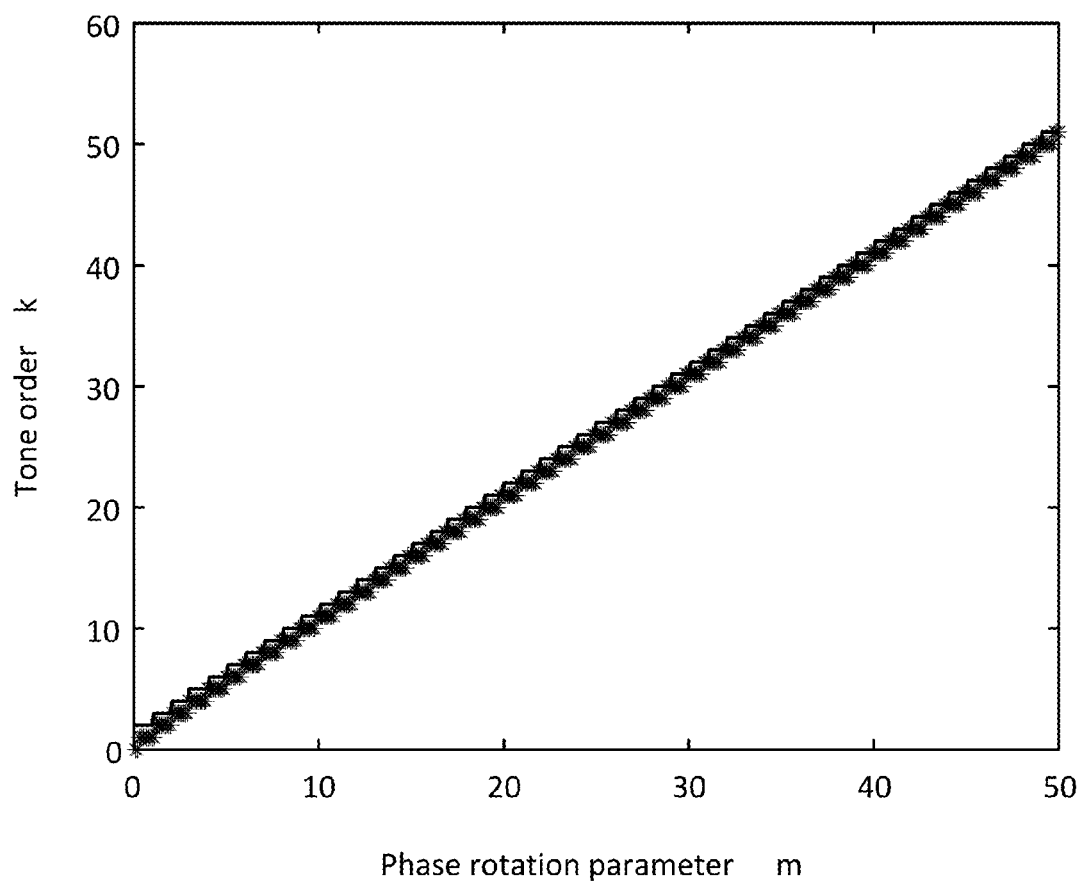
FIG. 2 is a plot of tone order k as a function of phase rotation parameter m for the system shown in FIG. 1.

The coefficients $B_p$ and $C_q$ correspond to the upper and lower sidebands of the spectrum spanned by the nonlinear phase modulation. The formulation in Eq. (4) allows for derivation of the bandwidth occupied by the output field analogous to the Carson's rule for phase-modulation signal. As shown in FIG. 2, more than 98% of the total power is contained within the first $k^{th}$-order tones where k=ceil(m)+1 with ceil(m) denotes the smallest integer greater than m. Indeed, this empirical rule is the strict indication that the number of tones obtainable in a homogenous mixer is very limited. As a practical illustration, generation of the $10^{th}$-order tone in a 100-m mixing fiber with a 10 $W^{-1}$ $km^{-1}$ nonlinear coefficient requires a total pump power of approximately 10 W. CW lasers capable of this power output are of limited practical use and the power level also exceeds the handling capacity of highly-nonlinear fibers defined by the SBS threshold. Furthermore, the intense power can also initiate multiple wide-band noise generation processes (for instance, Raman scattering and parametric fluorescence), which eclipse the new frequency generation process. An attempt to spectrally broaden the linewidth of CW seed laser and circumvent the Brillouin threshold, leads to severe degradation of frequency comb spectral purity, thus preventing CW-seeded generation in homogeneous parametric mixer even in principle.

Figure 3:
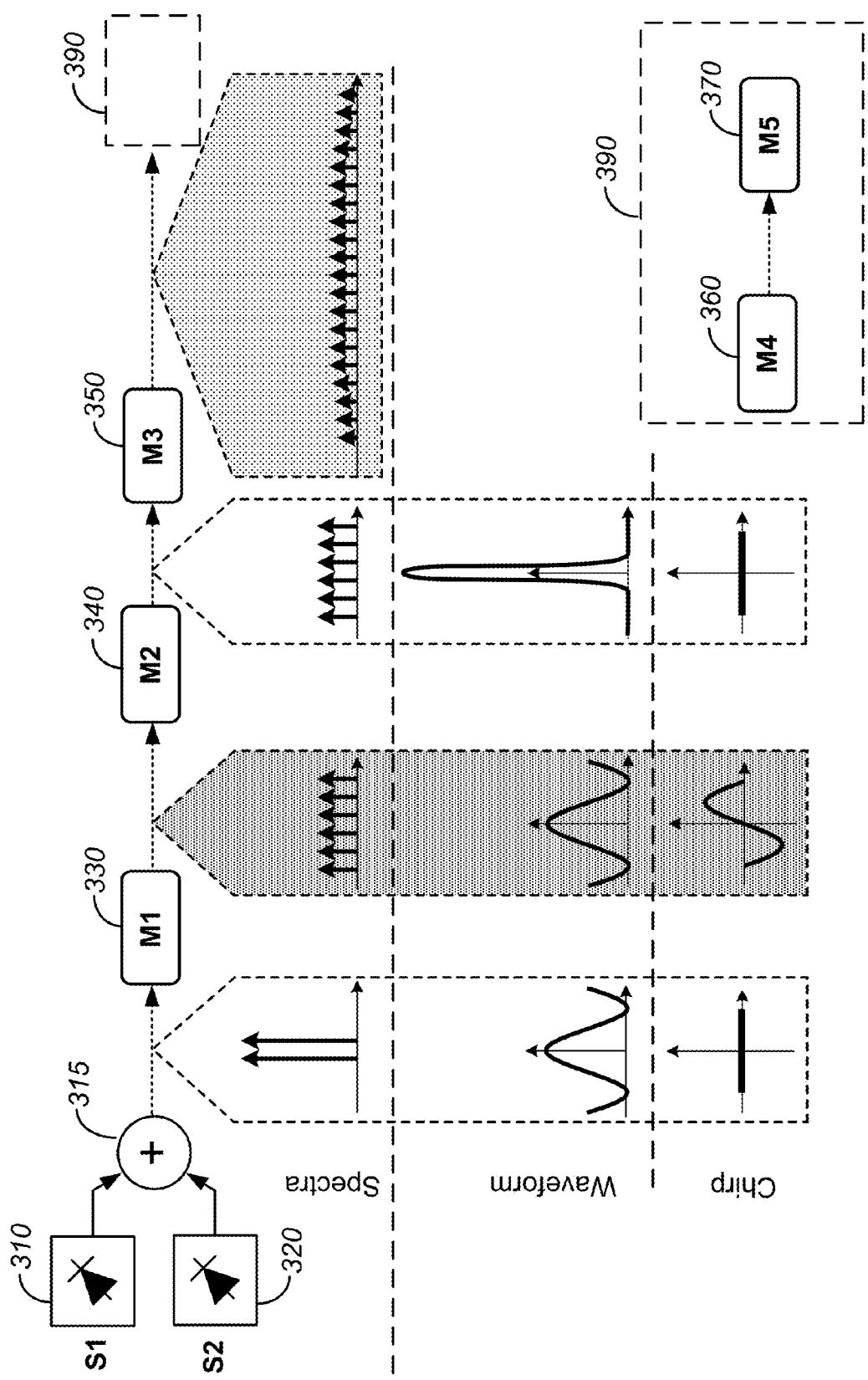
FIG. 3 is a simplified block diagram of a system where two input waves at two different frequencies are mixed by a multi-stage parametric mixer to generate a frequency comb, according to an embodiment of the invention.

The requirement for high-power CW seeding of a parametric mixer can be circumvented by introducing a multistage, dispersion engineered mixing design. The basic principle is illustrated in FIG. 3, which is an optical device for generating a frequency comb. The optical device includes an optical source including at least two input optical waves characterized by a first input frequency and a second input frequency, respectively. The first input frequency and the second input frequency are separated by a frequency spacing. As illustrated in FIG. 3, the optical source can include a first laser 310 (S1) and a second laser 320 (S2) that are combined using coupler 315. The spectral profile of the two input optical waves are illustrated in FIG. 3.

The optical device also includes a first waveguide 330 (M1) including a nonlinear optical medium characterized by a nonlinear optical response. Examples of suitable waveguides include fiber optic waveguides, lithium niobate waveguides, or silicon waveguides, chalcogenide waveguides, or the like. The first waveguide is operable to mix the at least two input optical waves to generate a plurality of first optical waves characterized by respective first frequencies separated from each other by the frequency spacing. As illustrated in FIG. 3, the spectral profile after passage through first waveguide 330 includes a plurality of frequencies with a predetermined frequency spacing between the frequencies. Additionally, as shown in FIG. 3, the first waveguide 330 introduces a frequency chirp in the plurality of first optical waves.

The optical device further includes a second waveguide 340 concatenated to the first waveguide 330. As will be evident to one of skill in the art, fiber couplers or other suitable devices can be used to concatenate the second waveguide 340 to the first waveguide 330. The second waveguide 340 is characterized by a first dispersion characteristics such that the second waveguide is operable to compress the waveforms of the plurality of first optical waves and to reduce the frequency chirp introduced by the first waveguide. As illustrated in FIG. 3, in some implementations, the frequency chirp is canceled, for example reduced to less than 10 GHz/s, for example, less than 5 GHz/s, less than 1 GHz/s, or the like. Thus, embodiments of the present invention provide for effective cancelation of the frequency chirp introduced by the first waveguide.

The optical device additionally includes a third waveguide 350 concatenated to the second waveguide 340. The third waveguide 350 comprises a nonlinear optical medium and is operable to mix the plurality of first optical waves to generate a plurality of second optical waves characterized by respective second frequencies separated from each other by the frequency spacing. As illustrated in FIG. 3, the dispersion characteristics of the third waveguide 350 are such that the total number of second optical waves is increased with respect to the number of optical waves present after passing through second waveguide 340. In an embodiment, the total number of second optical waves is maximized whereas in other embodiment, the total number of second optical waves is increased with respect to the total number of first optical waves.

The first stage of the device (M1) comprises a first waveguide (330) (illustrated by mixer M1) that is made using a nonlinear waveguide. In the temporal domain, beating between two seed waves (pumps) S1 and S2 forms a sinusoidal intensity (power) dependence:

$$P(t)=2P_S(1+\cos(\Delta\omega t)), \quad (5)$$

where $P_S$ represents launched seed power and $\Delta\omega$ is angular frequency separation between the two seed frequency tones. As illustrated in FIG. 3, laser sources 310 (S1) and 320 (S2) are combined using coupler 315 to provide an input optical source for first waveguide 330. The propagation along the nonlinear waveguide of the first mixer stage (i.e., the first waveguide 330) will induce a temporally dependent phase shift governed by:

$$\phi(t)=\gamma P(t)L, \quad (6)$$

where $\gamma$ is the waveguide nonlinear parameter and L is the interaction length. This phase shift is also recognized as a frequency chirp, that can be described by commonly used dimensionless parameter C:

$$C = \frac{d^2\phi}{dt^2}t_0^2, \quad (7)$$

where $t_0$ represents a half-width (1/e) of the beat waveform intensity. From Eq. 5, the characteristic time $t_0$ can be calculated as:

$$t_0 = \frac{\arccos(2/e - 1)}{\Delta\omega} = \frac{\eta \cdot \pi}{\Delta\omega}, \quad (8)$$

where $\eta \approx 0.59$. Consequently, by combining (8) and (5), the corresponding chirp parameter is $$C=-2\gamma PL(\eta\cdot\pi)^2 \cos(\Delta\omega t). \quad (9)$$

According to Eq. 9, the chirp parameter contains higher order terms. However, within the beat time interval (i.e. $\sim 2\pi/\Delta\omega$), by limiting the chirp compensation to the quadratic part only and in the vicinity of the pulse peak requires:

$$|C|=2\gamma PL(\eta\cdot\pi)^2. \quad (10)$$

The last relation serves as a motivation for the introduction of the second stage (M2) (also referred to as a second optical waveguide 340) of the parametric mixer. This stage compresses the beat waveform formed by the two seed pumps and achieves substantially higher peak optical intensity. In practice, this is accomplished by compensating SPM-induced chirp introduced by the first stage of the device (i.e., first optical waveguide 330 (M1)). Waveform compression inherently leads to an increase of the waveform peak intensity. Parametric mixing is often characterized by its Figure of Merit (FoM), defined as a product of peak power (P), mixer interaction length (L) and waveguide nonlinearity ($\gamma$). As a consequence, the FoM of the parametric mixing stage immediately following the compression stage (M2) will be correspondingly increased. To achieve an optimal FoM increase, it is important to estimate the optimal length of the compressor and its dispersion. By approximating the beat waveform with Gaussian function, the optimum length of the compressor $L_C$ can be found to be:

$$L_C = L_D \frac{|C|}{1+C^2}, \quad (11)$$

where $L_D$ is recognized as a characteristic dispersion length given by $$L_D = \frac{t_0^2}{|\beta_2|}, \quad (12)$$

where $\beta_2$ is the second-order dispersion of the waveguide used in compression (M2) stage. Let us consider a practical example in which two CW tones (pumps) with 1 W power are launched into a 100-m long fiber with a nonlinear coefficient of 20/W/km. Eq. 5 then defines the corresponding chirp parameter C to be 13.5. If the pumps waves are separated by 1 nm, the characteristic time is $t_0=\eta/2\Delta f=2.35$ ps. For such a pulse duration, the characteristic dispersion length $L_D$ in a conventional single-mode fiber (SMF) with $\beta_2=2\cdot 10^{-26}$ s$^2$/m is 270 m and the optimum length of the compressor is $L_C=20$ m (Eq. 6).

On the other hand, note that according to Eq. 5, the effective chirp generation is governed by the HNLF type and its confinement factor (or, equivalently to the nonlinearity $\gamma$) In practice, it is generally preferable to use a high nonlinear coefficient $\gamma(>20$/W/km) fiber rather than a longer fiber interaction length (L). The length of the first stage should be short enough in order to avoid pump back-reflection due to stimulated Brillouin scattering (SBS) and to minimize any polarization-mode dispersion impairments. While the SBS can be suppressed by applying longitudinally varying tension, this method typically leads to a Brillouin threshold increase of 15 dB in a standard 100-m HNLF segment before the onset of ancillary impairments. Besides reduction in the interaction length, the high-gamma choice is equivalent to higher confinement waveguides, which, in turn, require a smaller stretching force, allowing for a higher tension gradient to be induced below the mechanical breaking limit.

FIG. 3 illustrates M1, M2, and M3 as concatenated waveguides, but one of skill in the art will appreciate that fiber couplers, optical fiber connectors, fusion splicing, amplifiers, spectral filters, polarizers, polarization rotators, etalons, collimators, other optical elements, and the like can be used to provide systems within the scope of the invention. Thus, the term concatenation does not require direction connections between adjacent waveguides, but can include fiber connectors, filters, amplifiers, and the like. One of ordinary skill in the art would recognize many variations, modifications, and alternatives.

Additionally, in some embodiments, additional waveguides can be utilized to provide similar optical effects to those produced by the use of the second waveguide 340 and the third waveguide 350. In some implementations, the effects produced by M2 and M3 are replicated, whereas in other implementations, the chirp is reduced by one of the waveguides and the number of tones is increased by another of the waveguides, but not in an identical manner to that achieved using M2 and M3. Referring once again to FIG. 3, the optical device includes a fourth waveguide 360 concatenated to the third waveguide 350 and a fifth waveguide 370 concatenated to the fourth waveguide 360 (illustrated by block 390 in FIG. 3). The fourth waveguide 360 is characterized by a third dispersion characteristics such that the fourth waveguide is operable to reduce or cancel the frequency chirp in the plurality of second optical waves introduced by the third waveguide. Additionally, the optical device includes a fifth waveguide 370 concatenated to the fourth waveguide 360. The fifth waveguide comprises a nonlinear optical medium and is operable to mix the plurality of second optical waves to generate a plurality of third optical waves characterized by respective third frequencies separated from each other by the frequency spacing. The fifth waveguide is characterized a fourth dispersion characteristics that further increases the total number of third optical waves in comparison with the total number of second optical waves.

Design Considerations—Pulse Compression Stage

Figure 4:
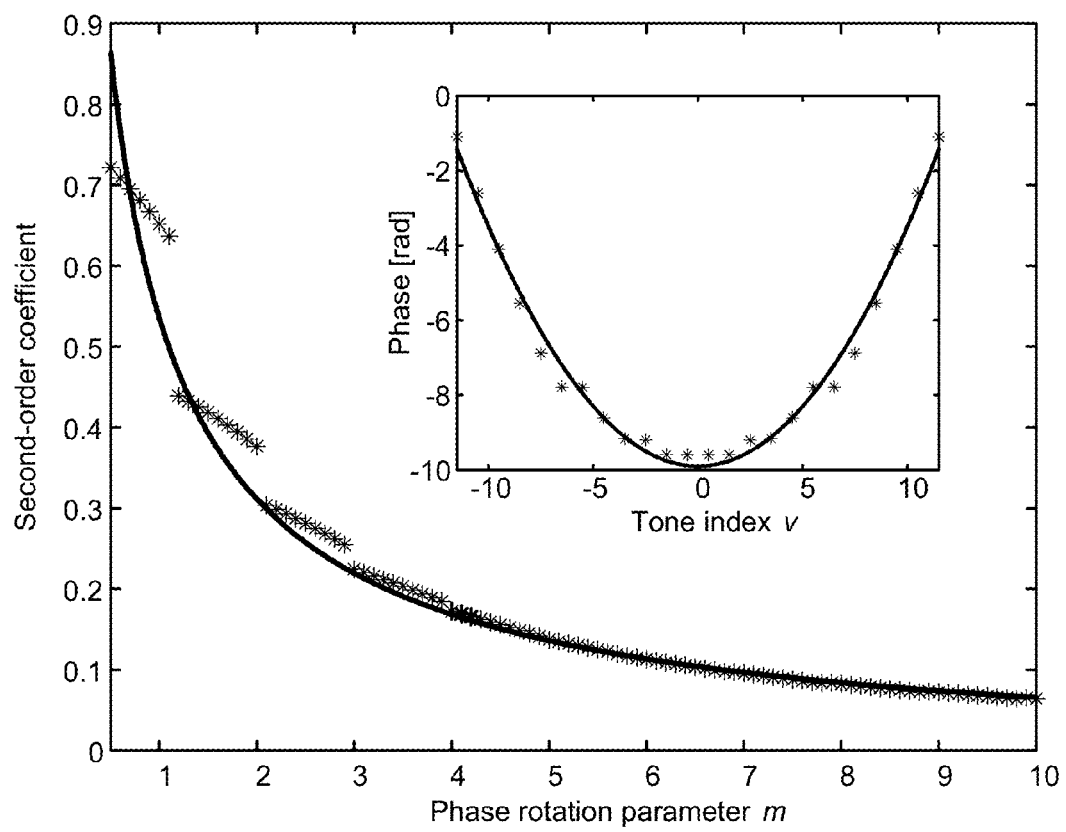
FIG. 4 are plots of the second-order coefficient in the polynomial describing the spectral phase as a function of phase rotation parameter m, according to an embodiment of the invention; the inset is a plot of phase as a function of tone index v, according to an embodiment of the invention.

In the first stage, the mixer (i.e., first optical waveguide 330) comprises an achromatic nonlinear section characterized by the absence of chromatic dispersion, which is followed by a dispersive section with appropriate chromatic dispersion to convert the chirped field into transform-limited pulses. The phase profile of the chirped field obtained at the output of the first nonlinear section is largely quadratic (shown in the inset of FIG. 4), under the assumption that the nonlinear section is dispersion-less. Introducing the index $v=(\omega-\omega_c)/\Delta\omega$ to denote the spectral position of the tones, the second-order coefficient $c_2$ in the polynomial describing the spectral phase $p(v)=c_2 v^2+c_1 v+c_0$ was found to follow a modified exponential decay function shown in FIG. 4:

$$c_2 = 30.89 \exp(-4.055\, m^{0.181}) \quad (13)$$

Consequently, a dispersive element providing second-order dispersion can provide the appropriate dispersion to transform the quadratic spectral phase profile into a linear one, thereby converting the field into transform-limited pulses. The corresponding optimal group-velocity dispersion $\beta_2$ for the dispersive element is then found by noting that the optimal $\beta$ should rectify the spectral phase profile $p(v\Delta\omega)$:

$$\beta_2 = -\frac{61.79}{\Delta\omega^2}\exp(-4.055 m^{0.181}) \quad (14)$$

Figure 5:
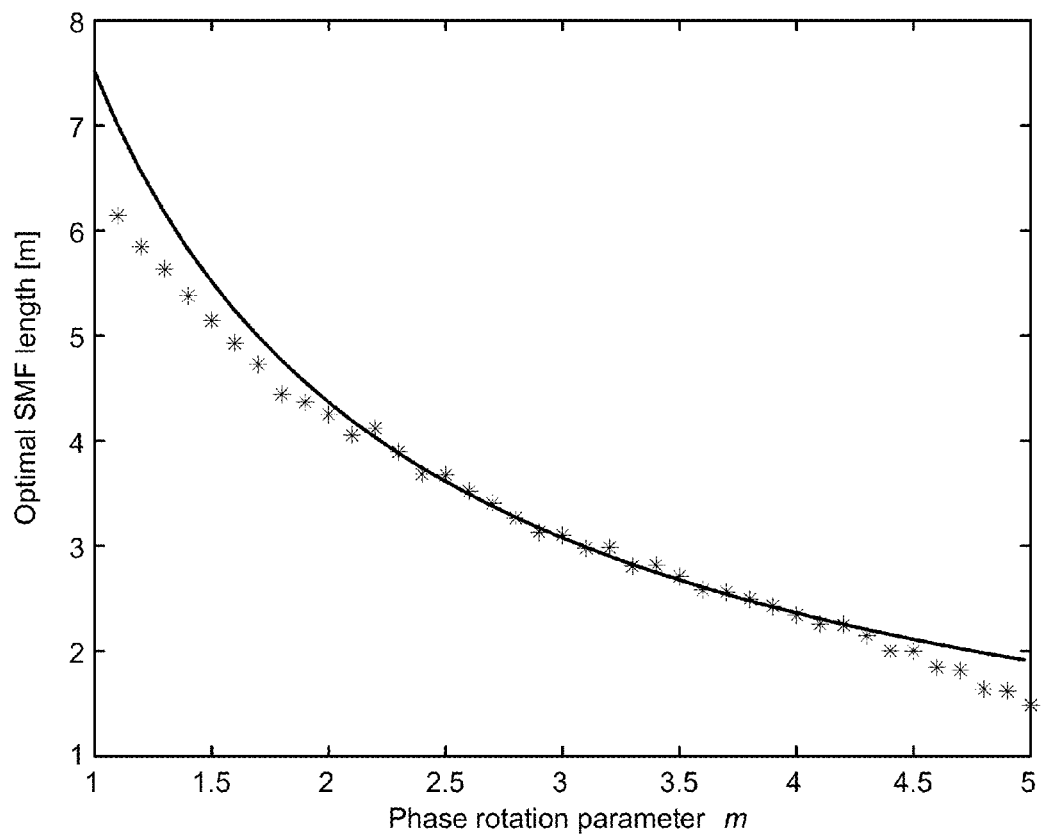
FIG. 5 are plots of the optimal single-mode fiber (SMF) length as a function of phase rotation parameter m, according to an embodiment of the invention.

In practice, the need for second-order dispersive element can be fulfilled by standard single-mode fibers (SMF) possessing negative $\beta_2$, or equivalently, positive chromatic dispersion parameters $D=-2\pi c\beta_2/\lambda^2$. FIG. 5 shows the optimal SMF length for compressing the output field of the first nonlinear section at various nonlinear phase modulation depth parameter m. The output field is obtained from a numerical model simulating the nonlinear propagation in a realistic highly-nonlinear fiber, characterized by a dispersion slope of 0.025 ps/nm²/km, nonlinear coefficient of 10/W/km, and loss of 0.5 dB/km.

Design Considerations—Mixing Stage

Figure 6:
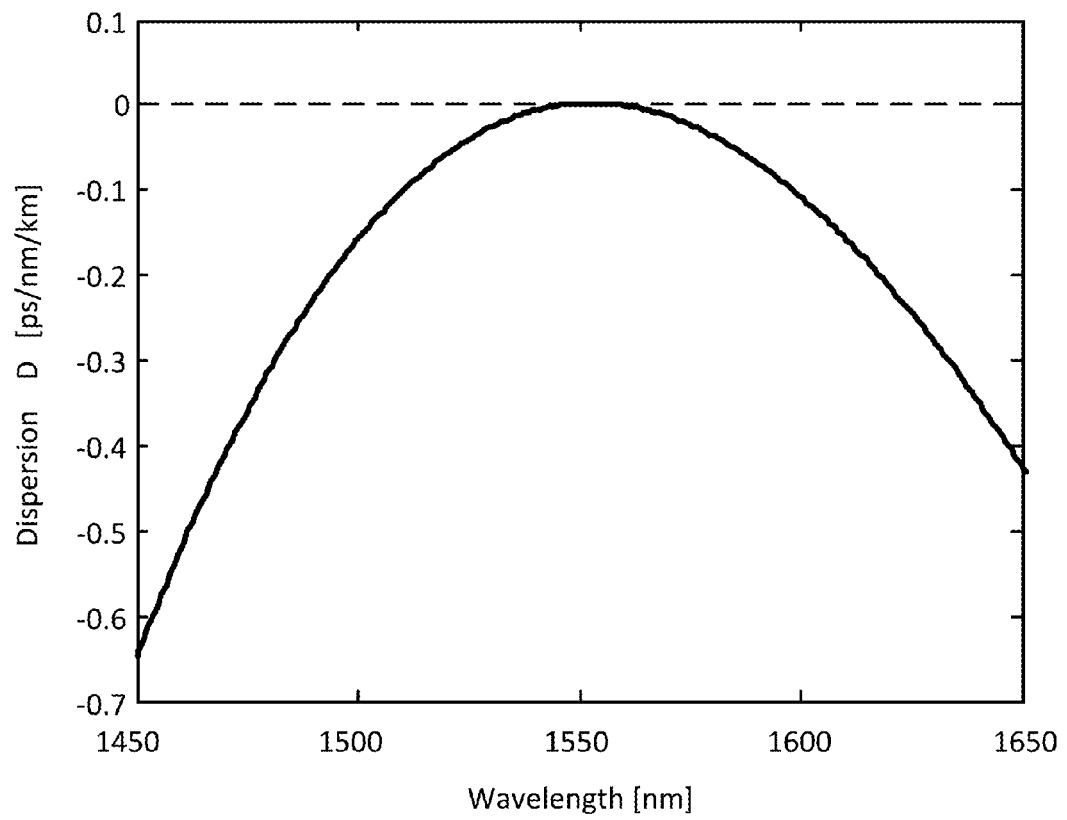
FIG. 6 is a dispersion curve of a dispersion-flattened fiber according to an embodiment of the invention.

Subsequent wide-band generation in the second stage (i.e., second waveguide 340) results in a much more stringent dispersion requirement in the nonlinear medium. An efficient mixing across a wide spectral range benefits from phase wideband matching; the latter specification translates to a need for a nonlinear waveguide possessing very low dispersion over a wide spectral range. In practice, dispersion-flattened fibers are deployed to satisfy the need for a weakly dispersive nonlinear medium. A typical dispersion profile of a dispersion-flattened fiber, as shown in FIG. 6, is characterized by a concave curve with its peak dispersion parameter close to zero. We denote the maximal dispersion parameter as $D_{peak}$; in FIG. 6, this corresponds to $D_{peak}=0$.

Figure 7:
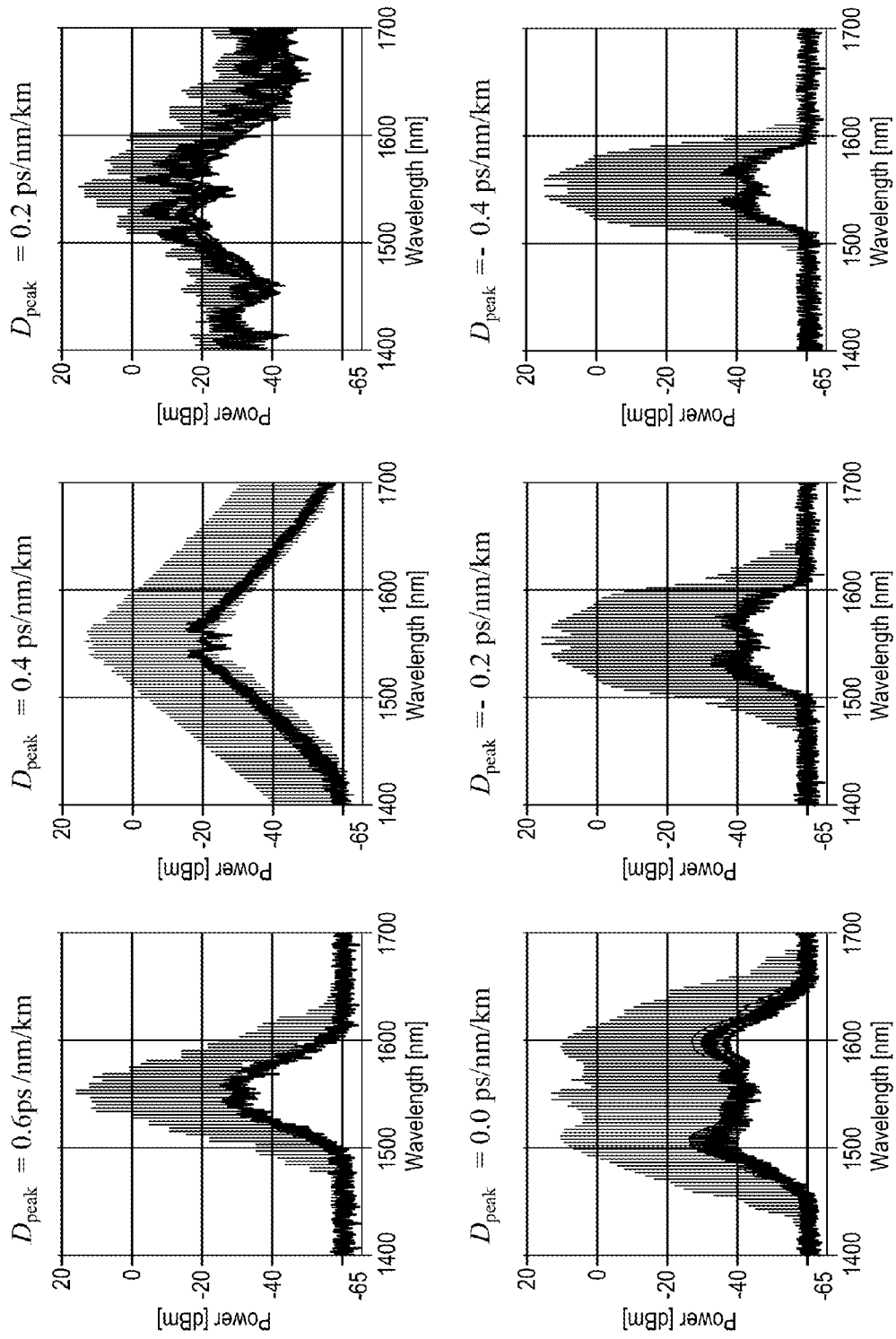
FIG. 7 shows output spectra of a multi-stage mixer, according to various embodiments of the invention.

FIG. 7 depicts the output spectra of the two-staged mixer, which are obtained with various peak dispersion parameters $D_{peak}$ in the second stage. When the peak dispersion in the second stage is in the normal regime (D<0), it is seen that the spectral span and uniformity progressively enhanced as $D_{peak}$ approaches zero. In sharp contrast, turning the peak of dispersion parameter into the anomalous regime (D>0) gives rise to intense noise generation. Spectral collapse is observed with an anomalous dispersion as low as +0.1 ps/nm/km. The noise enhancement in this regime is attributed to modulation instability (MI), by which the noise initiated a pulse-breakup process due to collaborative actions of Kerr effect and anomalous dispersion. The MI-induced fluorescence is particularly strong in this type of heterogeneous mixer, since the peak power level is enhanced in the previous (pulse compression) stage. Consequently, a nonlinear medium with normal dispersion is typically used in stages following the pulse compressor.

Figure 8:
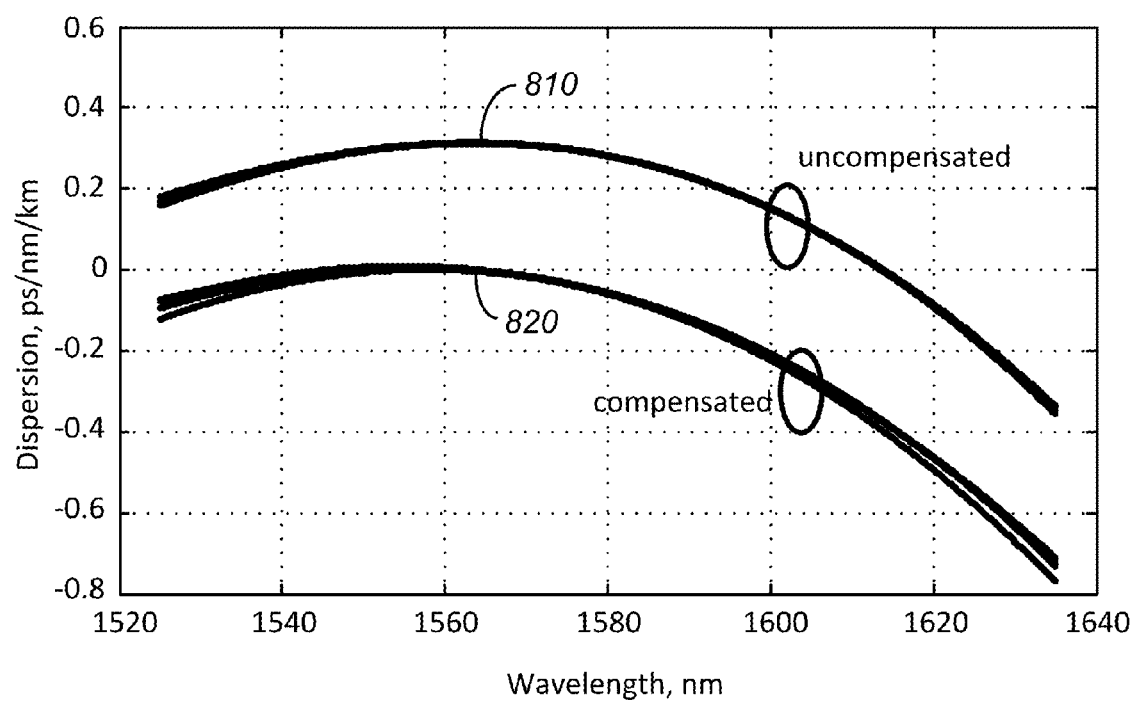
FIG. 8 shows dispersion curves of uncompensated and compensated dispersion-flattened high-nonlinear fibers (DF-HNLFs), according to various embodiments of the invention.
Figure 9A:
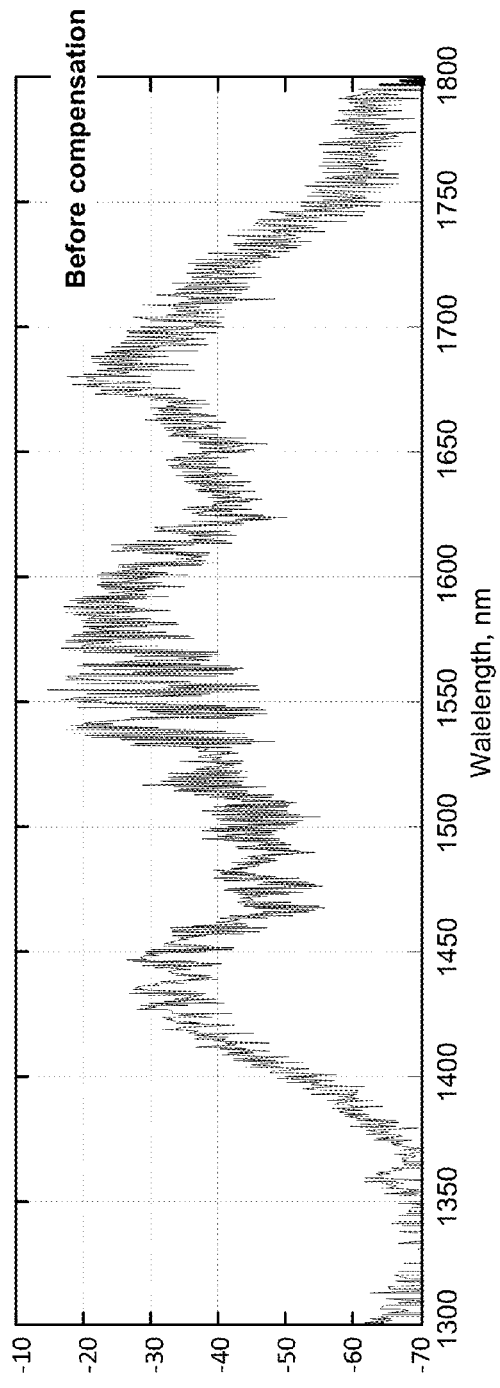
FIGS. 9*a* and 9*b* show output spectra of a multi-stage mixer before and after compensation, respectively, according to embodiments of the invention.

The use of precisely tuned dispersion in the mixer stage following the compressor is illustrated in the case when dispersion is suboptimal and optimal, as shown in FIG. 8. A commercial DF-HNLF fiber has a peak dispersion of approximately +0.3 ps/km-nm (curve 810 labeled as "uncompensated" in FIG. 8). This fiber, when used as a post-compressor stage in a CW-seeded mixer topology, results in frequency comb generation as shown in FIG. 9A. As expected, the frequency comb exhibits narrowband features, in accordance with the prediction given in FIG. 7, in the case when the peak dispersion is positive.

Figure 9B:
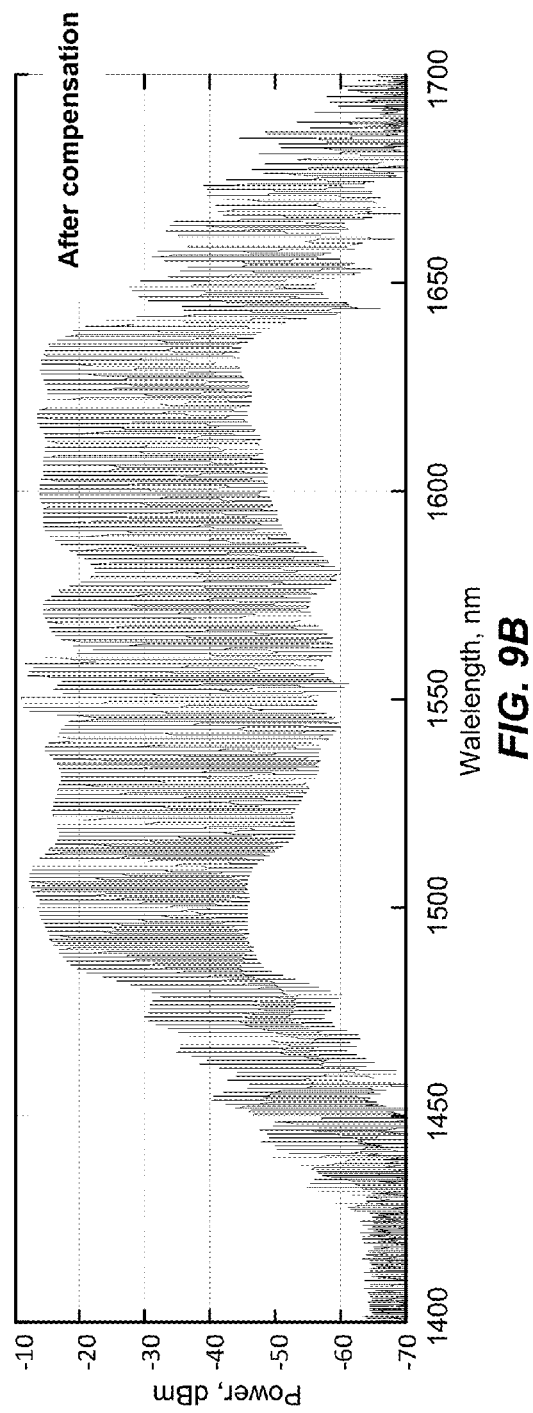

After the peak dispersion is compensated (for example by using longitudinal strain impaired during fiber spooling), the frequency comb generation is qualitatively altered (curve 820 in FIG. 8). FIG. 8 illustrates the dispersion compensation achieved by inducing longitudinal strain: the fiber peak dispersion is approximately zero after compensation. As a result, the frequency comb, shown in FIG. 9B, exhibits qualitatively better performance reflected in higher OSNR and spectral power equalization.

Since the wide-band mixing process uses the interplay between the dispersive and nonlinear effects, understanding the evolution of the field along the medium is useful for practical device construction. The propagation of an isolated Gaussian pulse $P(t)=P_0 \exp[-t^2/(T_0)^2]$ is chosen to mimic the evolution of the compressed field without the influence of pulse-to-pulse interaction. In the numerical model, the time T and position $\xi$ are proportional to the actual time t and position z, but normalized to the initial pulse-width $T_0$ and nonlinear phase rotation strength $\gamma P_0$, i.e. $T=t/T_0$, $\xi=z/\gamma P_0$. The normalization then yields the following governing equation for the normalized field envelope $A(\xi, T)$:

$$\frac{\partial A}{\partial \xi} = -\frac{\alpha}{2}A + i\left[\sum_{n=2}\frac{b_n}{n!}\left(\frac{1}{i}\frac{\partial}{\partial T}\right)^n + |A|^2\right]A \quad (15)$$

$$A(0, T) = \exp(-T^2) \quad (16)$$

$$b_n = \frac{1}{\gamma P_0}\frac{\beta_n}{T_0^n} \quad (17)$$

Figures 10A, 10B:
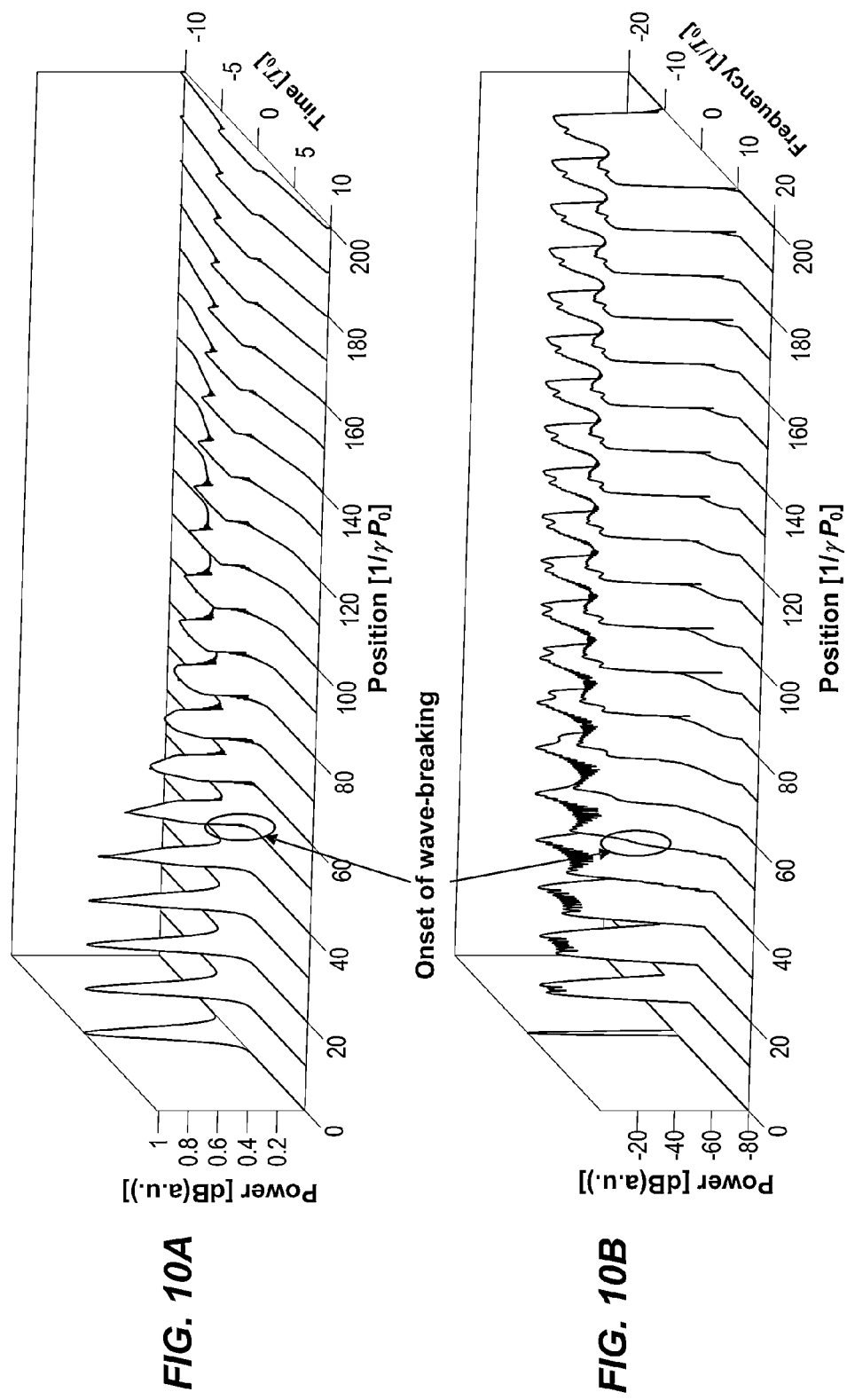
FIGS. 10*a* and 10*b* illustrate the temporal evolution and the spectral evolution, respectively, of a Gaussian pulse through a nonlinear medium, according to an embodiment of the invention.

FIG. 10A shows the evolution of the Gaussian pulse in the presence of only $4^{th}$-order dispersion. Following the initial dispersion-free propagation, the Gaussian pulse begins to evolve into an arch-shape, featured with steep edges and a near-triangular top portion. Known as optical shock-wave formation, the steepening of edges is a feature of nonlinear propagation in a normal dispersive medium, where the steepest points (initially the mid-points) of the pulse acquire the strongest chirp and disperse outward with the fastest pace, therefore aligning with the less-dispersed outer portions to form a even steeper edge. The shock-wave fronts are responsible for the creation of the outermost spectral components, which is depicted as the oscillatory portion on the spectral edges at ξ=40.

The position ξ=50 marks the onset of wave breaking, where the pulse edges reach the steepest point and start to collapse due to the continued exerted of the shear force by the chirp. Further propagation beyond this point leads to emerging of "wings" beyond the shock-wave fronts, accompanied by a rapid pulse broadening. In the spectral domain, the wave breaking phenomenon is reflected as the termination of spectral broadening, where the spectrum merely reshapes into a steady state. From these results, it is understood that normal dispersion, even at the $4^{th}$-order, provides a mechanism to produce a uniform spectral shape, through shock-wave formation and subsequent wave breaking. Furthermore, the convergence to a steady state in both the spectral and time domains contributes to a lower noise level in the higher-order generation process, in contrast to the soliton-forming propagation regime mediated by anomalous dispersion where miniscule fluctuations of the initial form would produce entirely different temporal and spectral profiles.

Figure 11:
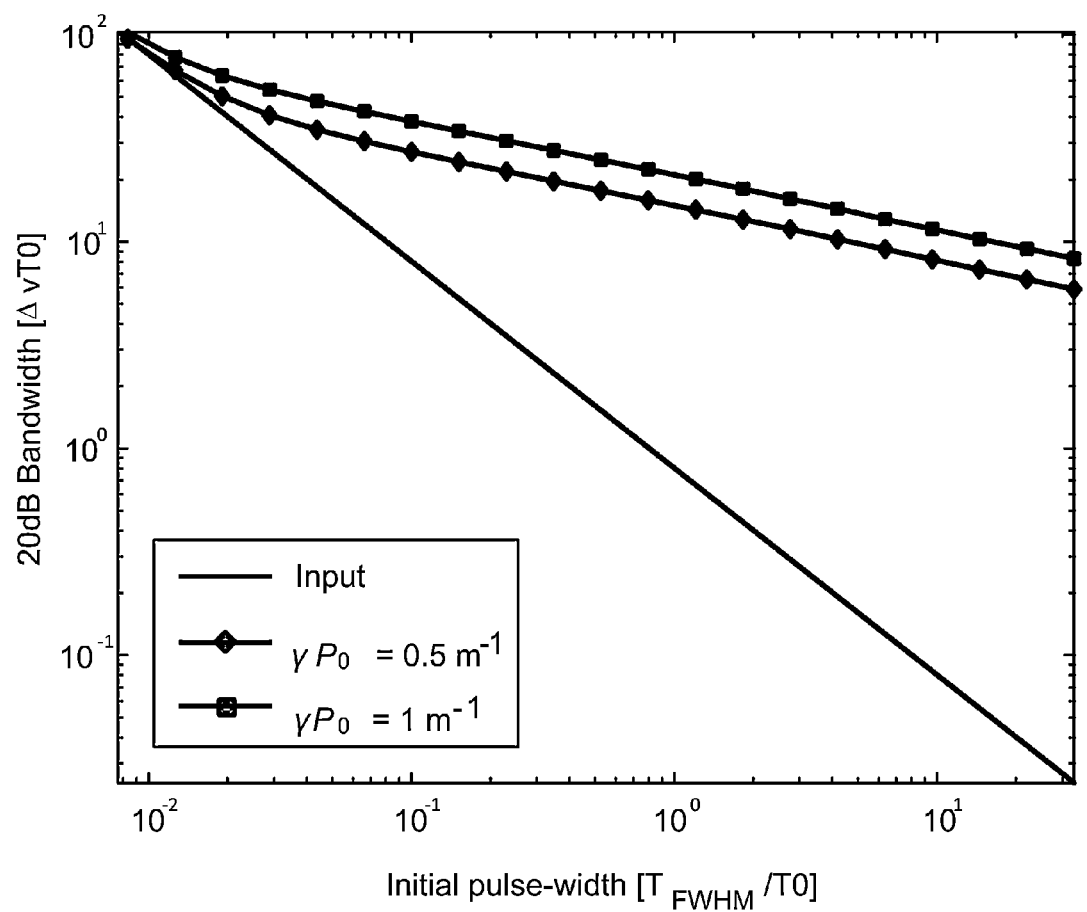
FIG. 11 are plots of bandwidth as a function of initial pulse width, according to various embodiments of the invention.
Figure 12:
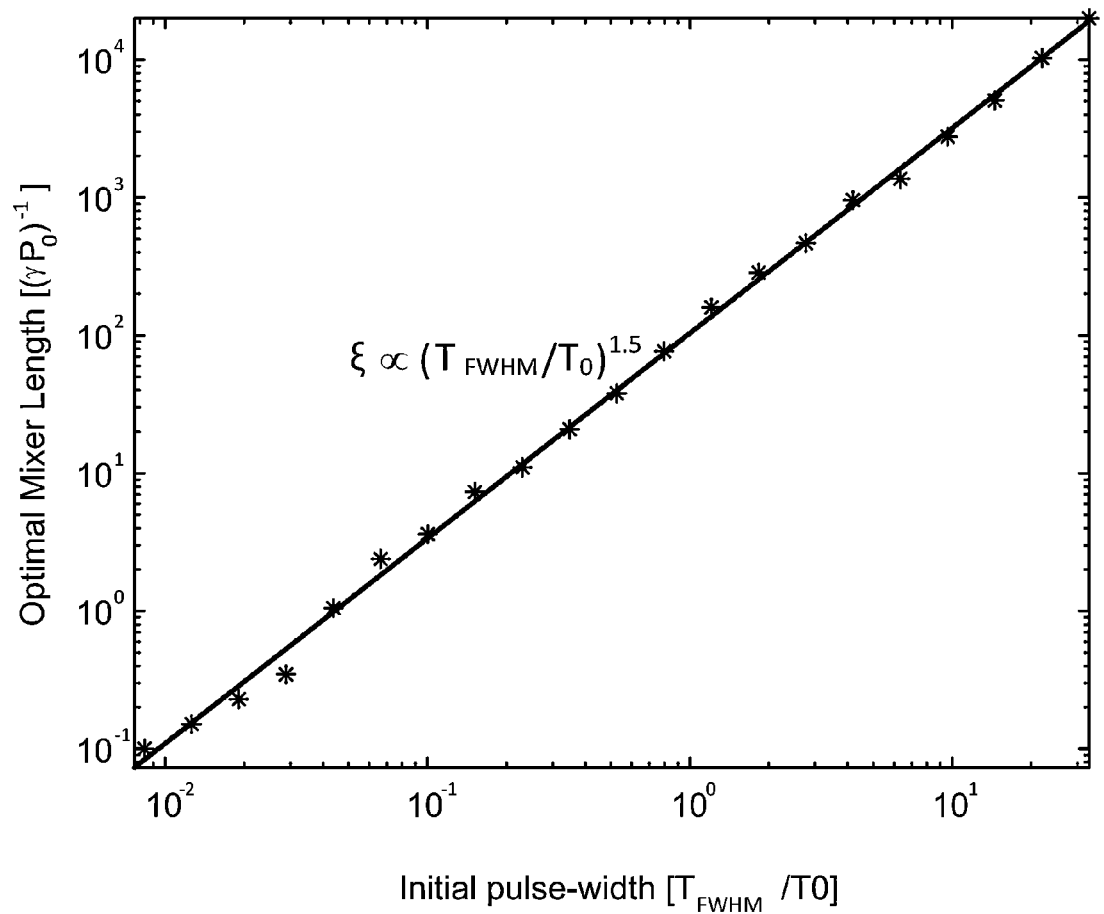
FIG. 12 is a plot of optimal length of a mixer stage as a function of initial pulse width, according to an embodiment of the invention.

Knowing the mechanism for the spectral broadening, the response of the mixer to different input characteristics, including power and pulse-width, can be used to derive design guidelines for the mixing stage. While it is expected that a more intense input and a shorter pulse-width will both yield a wider spectrum, the situation becomes nontrivial when the pulse energy is kept constant whereas either pulse-width or peak power is varied. FIG. 11 shows the 20-dB bandwidth of the mixing stage output against the full-width at half-maximum (FWHM) of the Gaussian pulse at the input. Although the spectral span of the output increases steadily with shorter input pulses, the bandwidth enhancement is diminishing at the same time. Indeed, a mixing stage operating with long pulses requires a significantly longer interaction length to reach the spectral convergence. The position of spectral convergence, as shown in FIG. 12, demonstrates a dependency to the input pulse-width to the power of 1.5 at both $\gamma P_0$=0.5/m and 1/m.

Figure 13:
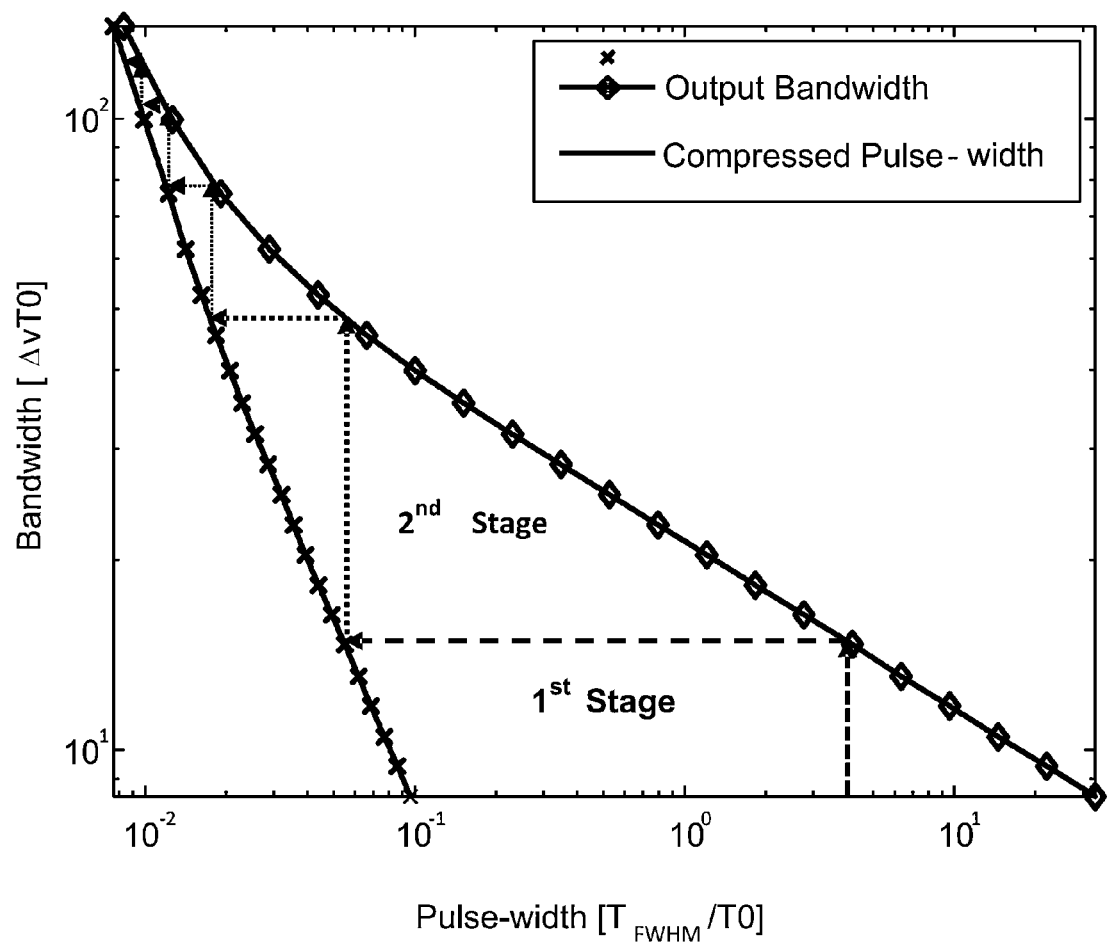
FIG. 13 are plots of bandwidth as a function of pulse width, according to embodiments of the invention.

Although the previous description on the bandwidth-enhanced mixer construct considers only two stages, it is possible to insert intermediate "boosting" stages to enhance the overall pulse compression efficiency, thereby achieving wider bandwidth at lower input power. The boosting stages share similar construction and functionality with the pulse compression stage, except that the nonlinear section should be characterized by similar achromaticity to the mixing stage in order to induce the highest possible pulse compression. If we assume the dispersive elements in the boosting stages are ideal i.e., able to convert the field into perfectly transform-limited pulses, the pulse-width/bandwidth plot in FIG. 13 can be modified to estimate the ultimate bandwidth attainable with boosting stages. Shown in FIG. 13, the bandwidth at the output of each boosting stage can be simply read-off from the chart by mapping the bandwidth of the preceding stage to the input pulse-width of the current stage, and subsequently to the output bandwidth of the same stage. Table 1 shows the performance of a mixer incorporating five boosting stages. Based on the previous finding that the spectral enhancement diminishes with increasing input bandwidth, the advantage of using more than one boosting stage preceding the final (mixing) stage is insignificant. Furthermore, the compression performance of a boosting stage is hampered when non-ideal dispersive elements (such as SMF) are deployed, since the higher-order dispersion effects in such elements are not compatible with wide spectral range for compression purpose. Therefore, the advantage of using boosting stages could be materialized only when operating with closely-spaced and/or low-power pumps, or equivalently, a narrow spectrum.

TABLE 1

Bandwidth and bandwidth gain in each stage in a multi-stage mixer.

| | Stage | | | | |
|---|---|---|---|---|---|
| | 1 | 2 | 3 | 4 | 5 |
| Bandwidth $\Delta\nu T_0$ | 14.6 | 45 | 66.7 | 82.4 | 94.9 |
| Bandwidth Gain | 72.7 | 3.1 | 1.5 | 1.2 | 1.1 |

The stage numbering excludes the pulse compression stage (i.e., Stage 1 represents the first stage succeeding the compression stage.) The bandwidth gain for stage 1 is obtained by comparing to the input bandwidth.

Figure 14:
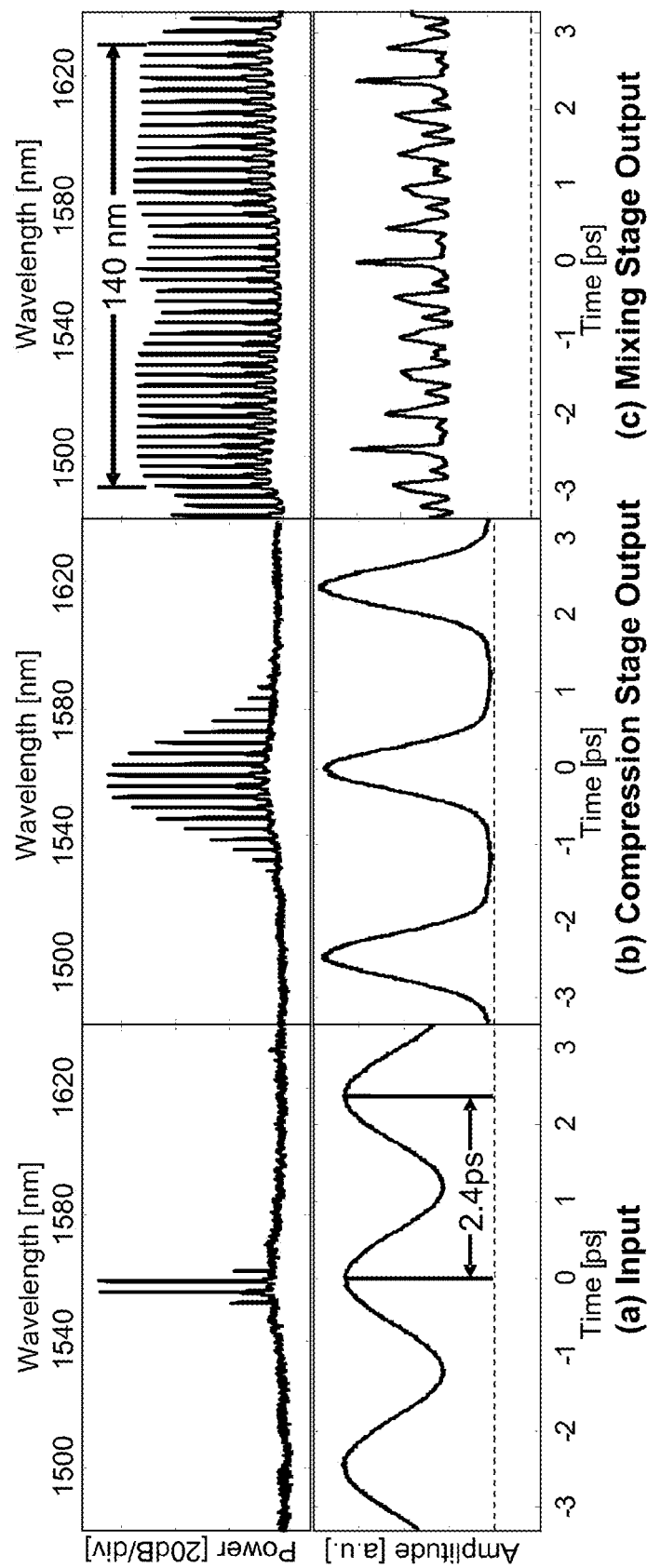
FIG. 14 shows the spectral (top) and temporal (bottom) evolution of the optical field at (a) the input, (b) after the compression stage, and (c) after the second mixing stage, in the system shown in FIG. 3, according to an embodiment of the invention.
Figure 15:
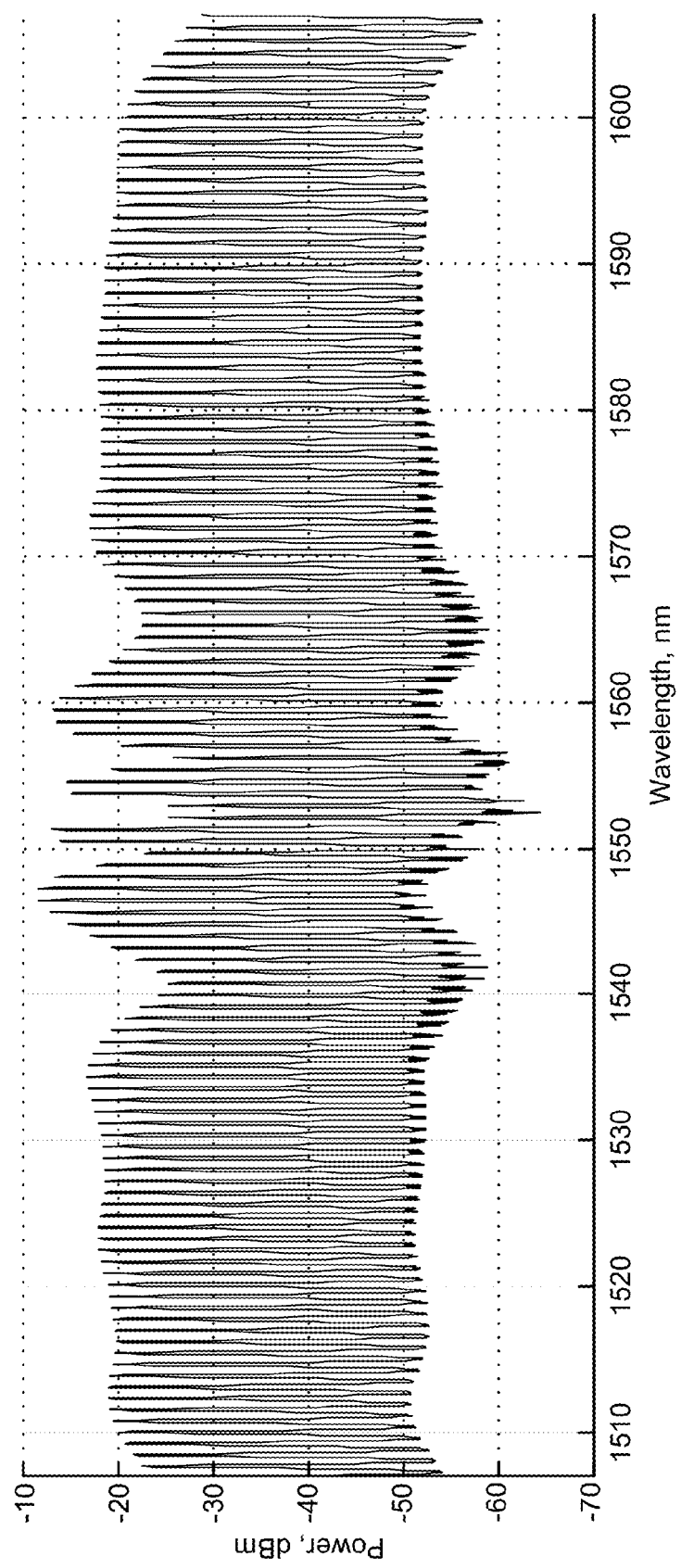
FIG. 15 shows an output spectrum of a multi-stage mixer, according to an embodiment of the invention.

The operation of the multi-stage parametric mixer in the context of optical frequency comb generation is illustrated by the spectral and temporal evolution of the optical field at various stages of the mixer in FIG. 14. The coherent beating of the two pump waves created a sinusoidal intensity pattern at the input, where the period (2.4 ps) corresponds to the frequency separation of the pumps (420 GHz). In the pulse compression stage, the sinusoidal pattern led to a nonlinear phase modulation of the entire optical field, therefore generating a grid of equidistant optical tones. Subsequent compression in the SMF section resulted in a Gaussian pulse train with a pulse width of 468 fs. The temporal compression also led to an enhancement of peak power by a factor k=2.4. The intensity enhancement factor can be obtained by equating the total energy of a single pulse before and after compression:

$$k = \frac{T_s}{T_{FWHM}} \sqrt{\frac{\ln 2}{\pi}} \tag{18}$$

where $T_s$ and $T_{FWHM}$ denote the period of the initial sinusoid, and the FWHM pulse width of the compressed pulses respectively. The temporal compression induced by spectral broadening of the initial pump field facilitated efficient generation of higher-order pumps, as shown in FIG. 14(c). As a consequence of low dispersion in the dispersion-flattened HNLF, an optical frequency comb spanning a spectral range of 140 nm with a power ripple below 10 dB is produced. Thus, embodiments of the present invention provide a wide frequency comb seeded by continuous-wave lasers. Optical signal-to-noise ratio (OSNR) exceeded 40 dB on all generated tones within the 10-dB range from the maximum, and was limited by parametric amplification of the residual ASE noise in the pumps. The large nonlinear phase shift acquired in the mixing stage was apparent in the auto-correlation trace of the output: a net dispersion of 0.08 ps/nm introduced by the interfacing pigtails was enough to form multiple satellite pulses via the temporal self-imaging effect. Further optimization on the connection loss and dispersion in the linear dispersive element (M2) as well as in the last nonlinear stage (M3) (i.e., third optical waveguide 350) had resulted in an enhancement in the power efficiency and frequency tone count—shown in FIG. 15, an optical frequency comb consisting of nearly 70 tones within the 10-dB bandwidth of 110 nm was created by pumping the optimized mixer at 500 mW per pump, reduced from 790 mW per pump in the mixer of FIG. 14.

Figure 16:
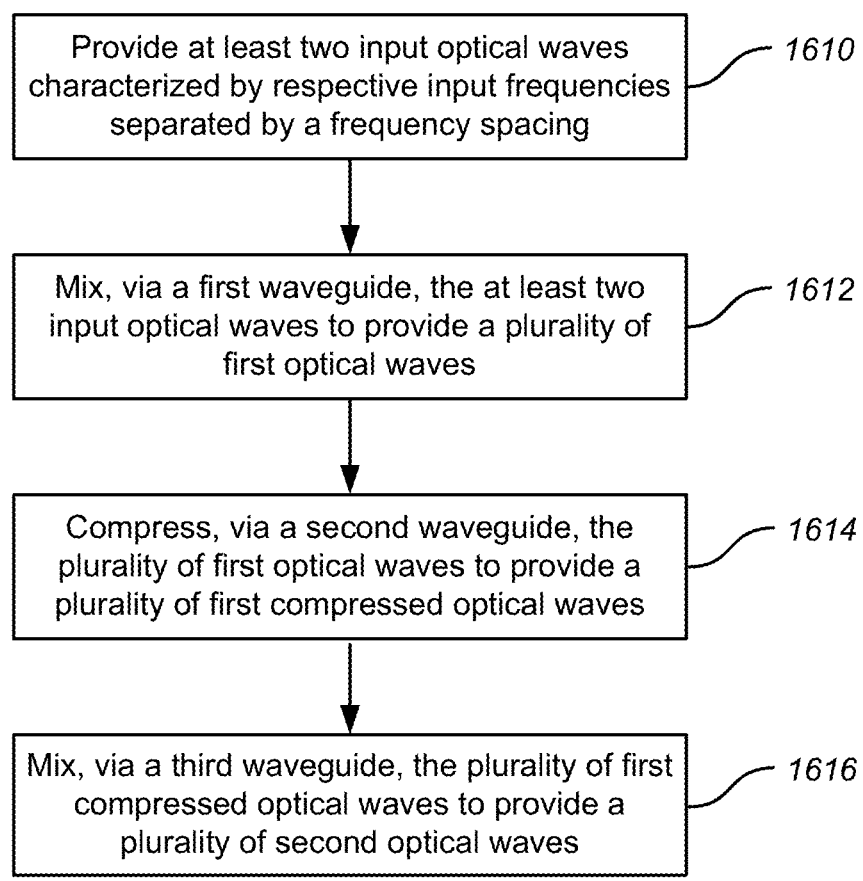
FIG. 16 is a simplified flowchart illustrating a method of generating a frequency comb according to an embodiment of the present invention.

FIG. 16 is a simplified flowchart illustrating a method of generating a frequency comb according to an embodiment of the present invention. The method 1600 includes providing at least two input optical waves characterized by respective input frequencies separated from each other by a frequency spacing (1610).

The method also includes mixing, via a first waveguide, the at least two input optical waves to provide a plurality of first optical waves characterized by respective first frequencies separated from each other by the frequency spacing (1612). The first waveguide comprises a nonlinear optical medium having a nonlinear response that introduces a frequency chirp in the plurality of first optical waves. The method further includes compressing, via a second waveguide concatenated to the first waveguide, the plurality of first optical waves to provide a plurality of first compressed optical waves (1614). The second waveguide is characterized by a first dispersion characteristics such that the second waveguide reduces or cancels the frequency chirp introduced by the first waveguide.

Additionally, the method includes mixing, via a third waveguide concatenated to the second waveguide, the plurality of first compressed optical waves to provide a plurality of second optical waves characterized by respective second frequencies separated from each other by the frequency spacing (1616). The third waveguide is characterized by a second dispersion characteristics that increases the total number of second optical waves in comparison with the total number of first optical waves. In some embodiments, the total number of second optical waves is maximized although this is not required by embodiments of the present invention.

In an embodiment, the method also includes compressing, via a fourth waveguide concatenated to the third waveguide, the plurality of second optical waves to provide a plurality of second compressed optical waves. The fourth waveguide is characterized by a third dispersion characteristics such that the fourth waveguide reduces or cancels the frequency chirp introduced by the third waveguide. In this embodiment, the method further includes mixing, via a fifth waveguide concatenated to the fourth waveguide, the plurality of second compressed optical waves to provide a plurality of third optical waves characterized by respective third frequencies separated from each other by the frequency spacing. The fifth waveguide is characterized by a fourth dispersion characteristics that maximizes a total number of third optical waves. In an alternative embodiment, the method also includes repeating compressing and mixing one or more times using additional stages.

In order to fabricate the third waveguide, a post-fabrication treatment can be applied to form the third waveguide and/or achieve the second dispersion characteristics. As an example, the post-fabrication treatment can include applying a longitudinal tension to the third waveguide. Additionally, the post-fabrication treatment can include irradiating the third waveguide with ultraviolet radiation in order to change the refractive index of the third waveguide. Another post-fabrication treatment can include a chemical process that changes the refractive index of the third waveguide. In another example, the method can include application of a post-fabrication treatment to the second waveguide to achieve the first dispersion characteristics.

It should be appreciated that the specific steps illustrated in FIG. 16 provide a particular method of generating a frequency comb according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical device for generating a frequency comb, the optical device comprising:
   an optical source operable to provide at least two input optical waves characterized by a first input frequency and a second input frequency, respectively, wherein the first input frequency and the second input frequency are separated by a frequency spacing;
   a first waveguide comprising a nonlinear optical medium characterized by:
      a nonlinear optical response; and
      operable to mix the at least two input optical waves to generate a plurality of first optical waves characterized by respective first frequencies separated from each other by the frequency spacing, wherein each input optical wave has a constant amplitude and a constant frequency;
   a dispersive element concatenated to the first waveguide, wherein the dispersive element is characterized by a first dispersion characteristics such that the dispersive element is operable to compress the waveforms of the plurality of first optical waves; and
   a second waveguide concatenated to the dispersive element, wherein:
      the second waveguide comprises a nonlinear optical medium operable to mix the plurality of first optical waves to generate a plurality of second optical waves characterized by respective second frequencies separated from each other by the frequency spacing, after the plurality of first optical waves are compressed by the dispersive element;
      the second waveguide has a physical length based on a width of a pulse of the plurality of first optical waves entering the second waveguide; and
      the second waveguide is a dispersion-flattened waveguide.

2. The optical device of claim 1 wherein the plurality of first optical waves is characterized by a frequency chirp, and the dispersive element is operable to reduce the frequency chirp.

3. The optical device of claim 1 wherein:
   the physical length of the second waveguide is greater than a length corresponding to onset of wave breaking in the second waveguide.

4. The optical device of claim 1 wherein:
   the second waveguide is characterized by a chromatic dispersion parameter D; and
   the chromatic dispersion parameter D has a value such that the dispersive element is operable to reduce a phase modulation introduced by the first waveguide.

5. The optical device of claim 1, wherein the first waveguide has a nonlinear coefficient greater than 20/W/km.

6. The optical device of claim 5 wherein the second waveguide is characterized by a second dispersion characteristics such that the second waveguide is operable to increase a total number of second optical waves with respect to a total number of first optical waves.

7. The optical device of claim 5 wherein the second waveguide is characterized by a dispersion slope that is not greater than about 10 ps/km-nm$^2$ within a spectral bandwidth of the plurality of second optical waves.

8. The optical device of claim 5 wherein the second waveguide is characterized by a unit-length chromatic dispersion that is not greater than about 2000 ps/km-nm within a spectral span of the frequency comb.

9. The optical device of claim 5 wherein each of the first waveguide and the second waveguide is characterized by a unit-length dispersion that is not greater than about 2000 ps/km-nm within a spectral bandwidth of the plurality of first optical waves and a spectral bandwidth of the plurality of second optical waves, respectively.

10. The optical device of claim 1, wherein the dispersive element is a first dispersive element, the optical device further comprising:
   a third waveguide concatenated to the first dispersive element and to a second dispersive element, wherein the third waveguide comprises a nonlinear optical medium and is operable to mix optical waves to generate additional optical waves separated from each other by the frequency spacing; and
   the second dispersive element concatenated to the third waveguide and to the second waveguide, wherein:
      the second dispersive element is characterized by a second dispersion characteristics such that the second dispersive element is operable to reduce a frequency chirp of the plurality of first optical waves introduced by the third waveguide; and
      the third waveguide and the second dispersive element are between the first dispersive element and the second waveguide.

11. A method of generating a frequency comb comprising:
   providing at least two input optical waves characterized by respective input frequencies separated from each other by a frequency spacing;
   mixing, via a first waveguide, the at least two input optical waves to provide a plurality of first optical waves characterized by respective first frequencies separated from each other by the frequency spacing, wherein each input optical wave has a constant amplitude and a constant frequency
   compressing, via a dispersive element concatenated to the first waveguide, the plurality of first optical waves to provide a plurality of first compressed optical waves; and
   mixing, via a second waveguide concatenated to the dispersive element, the plurality of first optical waves to generate a plurality of second optical waves characterized by respective second frequencies separated from each other by the frequency spacing, after the plurality of first optical waves are compressed by the dispersive element, wherein:
      the second waveguide is a dispersion-flattened waveguide; and
      the second waveguide has a physical length based on a width of a pulse of the plurality of first optical waves entering the second waveguide.

12. The method of claim 11 wherein the first waveguide introduces a frequency chirp in the plurality of first optical waves, and the dispersive element is characterized by a first dispersion characteristics such that the dispersive element reduces the frequency chirp introduced by the first waveguide.

13. The method of claim 11 wherein first waveguide has a nonlinear coefficient greater than 20/W/km.

14. The method of claim 11 wherein the second waveguide is characterized by a second dispersion characteristics that increases a total number of second optical waves in comparison to a total number of first optical waves at an output of the first waveguide.

15. The method of claim 11 comprising:
   mixing, via a third waveguide concatenated to the dispersive element, wherein the dispersive element is a first dispersive element, and to a second dispersive element, the first plurality of optical waves to generate additional optical waves separated by the frequency spacing, wherein the third waveguide and the second dispersive element are between the first dispersive element and the second waveguide; and
   compressing, via a second dispersive element concatenated to the third waveguide and to the second waveguide, optical waves from the third waveguide, wherein the second dispersive element is characterized by dispersion characteristics such that the second dispersive element reduces a frequency chirp introduced by the third waveguide.

16. An optical device for generating a frequency comb, the optical device comprising:
   an optical source operable to provide at least two input optical waves characterized by a first input frequency and a second input frequency, respectively, wherein the first input frequency and the second input frequency are separated by a frequency spacing; and
   a first waveguide comprising a nonlinear optical medium, wherein:
      the nonlinear optical medium is characterized by a nonlinear optical response; and
      the nonlinear optical medium is operable to mix the at least two input optical waves to generate a plurality of first optical waves characterized by respective first frequencies separated from each other by the frequency spacing, wherein each input optical wave has a constant amplitude and a constant frequency;
   a dispersive element concatenated to the first waveguide; and
   a second waveguide concatenated to the dispersive element, wherein:
      the second waveguide comprises a nonlinear optical medium operable to mix the plurality of first optical waves to generate a plurality of second optical waves characterized by respective second frequencies separated from each other by the frequency spacing, after the plurality of first optical waves pass through the dispersive element;
      the second waveguide has a physical length based on a width of a pulse of the plurality of first optical waves entering the second waveguide; and
      the second waveguide is a dispersion-flattened waveguide.

17. The optical device of claim 16, wherein the dispersive element is characterized by a first dispersion characteristics such that the dispersive element is operable to compress the waveforms of the plurality of first optical waves.

18. The optical device of claim 16, wherein the second waveguide has a nonlinear coefficient greater than 20/W/km.

19. The optical device of claim 17 wherein:
the plurality of first optical waves is characterized by a frequency chirp;
the dispersive element is operable to reduce the frequency chirp introduced by the first waveguide; and
the second waveguide is characterized by a second dispersion characteristics such that the second waveguide is operable to increase a total number of second optical waves with respect to a total number of first optical waves.

20. The optical device of claim 16 further comprising:
a third waveguide, between the dispersive element and the second waveguide, configured to mix optical waves, wherein the dispersive element is a first dispersive element; and
a second dispersive element, between the third waveguide and the second waveguide, configured to compress optical waves.

* * * * *

UNITED STATES PATENT AND TRADEMARK OFFICE
CERTIFICATE OF CORRECTION

PATENT NO. : 9,513,423 B2  
APPLICATION NO. : 13/886821  
DATED : December 6, 2016  
INVENTOR(S) : Kuo et al.

Page 1 of 1

It is certified that error appears in the above-identified patent and that said Letters Patent is hereby corrected as shown below:

On the Title Page

Item [72], delete "Yauheni Mysilvets" and insert --Yauheni Myslivets--

Signed and Sealed this
Seventeenth Day of October, 2017

Joseph Matal
*Performing the Functions and Duties of the
Under Secretary of Commerce for Intellectual Property and
Director of the United States Patent and Trademark Office*